United States Patent
Zhang et al.

(10) Patent No.: US 9,305,583 B1
(45) Date of Patent: Apr. 5, 2016

(54) METHOD FOR FABRICATING A MAGNETIC WRITER USING MULTIPLE ETCHES OF DAMASCENE MATERIALS

(71) Applicant: Western Digital (Fremont), LLC, Fremont, CA (US)

(72) Inventors: Jinqiu Zhang, Fremont, CA (US); Feng Liu, San Ramon, CA (US); Hongmei Han, Fremont, CA (US); Ming Sun, Pleasanton, CA (US); Xiaotian Zhou, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/280,342

(22) Filed: May 16, 2014

Related U.S. Application Data

(60) Provisional application No. 61/941,337, filed on Feb. 18, 2014.

(51) Int. Cl.
 *G11B 5/31* (2006.01)
 *G11B 5/855* (2006.01)
 *G11B 5/127* (2006.01)

(52) U.S. Cl.
 CPC ............ *G11B 5/855* (2013.01); *G11B 5/1278* (2013.01)

(58) Field of Classification Search
 CPC ..... G11B 5/1278; G11B 5/3116; C23C 16/06
 USPC .......................................... 216/22
 See application file for complete search history.

(56) References Cited

U.S. PATENT DOCUMENTS

| | | |
|---|---|---|
| 5,801,910 A | 9/1998 | Mallary |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |

(Continued)

OTHER PUBLICATIONS

Feng Liu, et. al., U.S. Appl. U.S. Appl. No. 13/631,808, filed Sep. 28, 2012, 17 pages.

(Continued)

*Primary Examiner* — Duy Deo
*Assistant Examiner* — Mahmoud Dahimene

(57) ABSTRACT

A method provides a magnetic transducer having an air-bearing surface (ABS) location. An intermediate layer that includes a first sublayer in a side shield region and a second sublayer outside of the side shield region is provided. A trench is formed in the intermediate layer using multiple etches. A first etch removes part of the second sublayer, providing a first portion of the trench having a first sidewall angle. A second etch removes part of the first sublayer, providing a second portion of the trench having a second sidewall angle. The second sidewall angle is greater than the first sidewall angle. A main pole is provided in the trench and has a plurality of sidewalls. The sidewalls have the second sidewall angle in the second portion of the trench and at least one main pole sidewall angle corresponding to the first sidewall angle in the first portion of the trench.

20 Claims, 20 Drawing Sheets

(56) References Cited

U.S. PATENT DOCUMENTS

| | | |
|---|---|---|
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,172,848 B1 | 1/2001 | Santini |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,675 B1 | 1/2003 | Shukh et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |

(56) References Cited

U.S. PATENT DOCUMENTS

| | | |
|---|---|---|
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,710,973 B2 | 3/2004 | Okada et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,722,018 B2 | 4/2004 | Santini |
| 6,724,569 B1 | 4/2004 | Chen et al. |
| 6,724,572 B1 | 4/2004 | Stoev et al. |
| 6,729,015 B2 | 5/2004 | Matono et al. |
| 6,731,460 B2 | 5/2004 | Sasaki |
| 6,735,850 B1 | 5/2004 | Gibbons et al. |
| 6,737,281 B1 | 5/2004 | Dang et al. |
| 6,738,223 B2 | 5/2004 | Sato et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,762,911 B2 | 7/2004 | Sasaki et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,813,116 B2 | 11/2004 | Nakamura et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Spallas et al. |
| 6,834,010 B1 | 12/2004 | Qi et al. |
| 6,857,181 B2 | 2/2005 | Lo et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,697 B2 | 5/2005 | Nakamura et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,903,900 B2 | 6/2005 | Sato et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,255 B2 | 9/2005 | Hsiao et al. |
| 6,947,258 B1 | 9/2005 | Li |
| 6,950,266 B1 | 9/2005 | McCaslin et al. |
| 6,950,277 B1 | 9/2005 | Nguy et al. |
| 6,952,325 B2 | 10/2005 | Sato et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 6,995,949 B2 | 2/2006 | Nakamura et al. |
| 7,006,326 B2 | 2/2006 | Okada et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,070,698 B2 | 7/2006 | Le |
| 7,092,195 B1 | 8/2006 | Liu et al. |
| 7,100,266 B2 | 9/2006 | Plumer et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,252 B2 | 11/2006 | Takano et al. |
| 7,133,253 B1 | 11/2006 | Seagle et al. |
| 7,134,185 B1 | 11/2006 | Knapp et al. |
| 7,139,153 B2 | 11/2006 | Hsiao et al. |
| 7,154,715 B2 | 12/2006 | Yamanaka et al. |
| 7,159,302 B2 | 1/2007 | Feldbaum et al. |
| 7,170,725 B1 | 1/2007 | Zhou et al. |
| 7,177,117 B1 | 2/2007 | Jiang et al. |
| 7,185,415 B2 | 3/2007 | Khera et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,206,166 B2 | 4/2007 | Notsuke et al. |
| 7,211,339 B1 | 5/2007 | Seagle et al. |
| 7,212,379 B2 | 5/2007 | Hsu et al. |
| 7,212,384 B1 | 5/2007 | Stoev et al. |
| 7,238,292 B1 | 7/2007 | He et al. |
| 7,239,478 B1 | 7/2007 | Sin et al. |
| 7,245,454 B2 | 7/2007 | Aoki et al. |
| 7,248,431 B1 | 7/2007 | Liu et al. |
| 7,248,433 B1 | 7/2007 | Stoev et al. |
| 7,248,449 B1 | 7/2007 | Seagle |
| 7,251,878 B2 | 8/2007 | Le et al. |
| 7,253,992 B2 | 8/2007 | Chen et al. |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |

(56) References Cited

U.S. PATENT DOCUMENTS

| | | |
|---|---|---|
| 7,289,303 B1 | 10/2007 | Sin et al. |
| 7,292,409 B1 | 11/2007 | Stoev et al. |
| 7,296,338 B2 | 11/2007 | Le et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,324,304 B1 | 1/2008 | Benakli et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,369,359 B2 | 5/2008 | Fujita et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,392,577 B2 | 7/2008 | Yazawa et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,095 B2 | 9/2008 | Benakli et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,441,325 B2 | 10/2008 | Gao et al. |
| 7,443,632 B1 | 10/2008 | Stoev et al. |
| 7,444,740 B1 | 11/2008 | Chung et al. |
| 7,464,457 B2 | 12/2008 | Le et al. |
| 7,469,467 B2 | 12/2008 | Gao et al. |
| 7,493,688 B1 | 2/2009 | Wang et al. |
| 7,508,627 B1 | 3/2009 | Zhang et al. |
| 7,508,628 B2 | 3/2009 | Che et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,535,675 B2 | 5/2009 | Kimura et al. |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,558,019 B2 | 7/2009 | Le et al. |
| 7,580,222 B2 | 8/2009 | Sasaki et al. |
| 7,583,466 B2 | 9/2009 | Kermiche et al. |
| 7,595,967 B1 | 9/2009 | Moon et al. |
| 7,639,451 B2 | 12/2009 | Yatsu et al. |
| 7,639,452 B2 | 12/2009 | Mochizuki et al. |
| 7,639,457 B1 | 12/2009 | Chen et al. |
| 7,643,246 B2 | 1/2010 | Yazawa et al. |
| 7,660,080 B1 | 2/2010 | Liu et al. |
| 7,663,839 B2 | 2/2010 | Sasaki et al. |
| 7,672,079 B2 | 3/2010 | Li et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,748,104 B2 | 7/2010 | Bonhote et al. |
| 7,764,469 B2 | 7/2010 | Ho et al. |
| 7,785,666 B1 | 8/2010 | Sun et al. |
| 7,796,356 B1 | 9/2010 | Fowler et al. |
| 7,796,360 B2 | 9/2010 | Im et al. |
| 7,796,361 B2 | 9/2010 | Sasaki et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,841,068 B2 | 11/2010 | Chen et al. |
| 7,846,643 B1 | 12/2010 | Sun et al. |
| 7,855,854 B2 | 12/2010 | Hu et al. |
| 7,859,791 B2 | 12/2010 | Toma et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,881,019 B2 | 2/2011 | Hsiao et al. |
| 7,898,773 B2 | 3/2011 | Han et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,425 B2 | 3/2011 | Sasaki et al. |
| 7,916,426 B2 | 3/2011 | Hu et al. |
| 7,918,013 B1 | 4/2011 | Dunn et al. |
| 7,921,544 B2 | 4/2011 | Sasaki et al. |
| 7,924,528 B2 | 4/2011 | Sasaki et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,027,125 B2 | 9/2011 | Lee et al. |
| 8,054,586 B2 | 11/2011 | Balamane et al. |
| 8,066,892 B2 | 11/2011 | Guthrie et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,033 B2 | 2/2012 | Kameda et al. |
| 8,116,043 B2 | 2/2012 | Leng et al. |
| 8,116,171 B1 | 2/2012 | Lee |
| 8,117,738 B2 | 2/2012 | Han et al. |
| 8,125,732 B2 | 2/2012 | Bai et al. |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,169,741 B2 | 5/2012 | Taguchi et al. |
| 8,171,618 B1 | 5/2012 | Wang et al. |
| 8,179,636 B1 | 5/2012 | Bai et al. |
| 8,184,399 B2 | 5/2012 | Wu et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |

(56) References Cited

U.S. PATENT DOCUMENTS

| | | |
|---|---|---|
| 8,227,023 B1 | 7/2012 | Liu et al. |
| 8,228,633 B1 | 7/2012 | Tran et al. |
| 8,231,796 B1 | 7/2012 | Li et al. |
| 8,233,233 B1 | 7/2012 | Shen et al. |
| 8,233,234 B2 | 7/2012 | Hsiao et al. |
| 8,233,235 B2 | 7/2012 | Chen et al. |
| 8,233,248 B1 | 7/2012 | Li et al. |
| 8,248,728 B2 | 8/2012 | Yamaguchi et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,792 B2 | 9/2012 | Bai et al. |
| 8,264,797 B2 | 9/2012 | Emley |
| 8,264,798 B1 | 9/2012 | Guan et al. |
| 8,270,109 B2 | 9/2012 | Ohtsu |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,649 B2 | 10/2012 | Sasaki et al. |
| 8,289,821 B1 | 10/2012 | Huber |
| 8,291,743 B1 | 10/2012 | Shi et al. |
| 8,305,711 B2 | 11/2012 | Li et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,347,488 B2 | 1/2013 | Hong et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,687 B2 | 7/2013 | Sasaki et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,080 B2 | 7/2013 | Sasaki et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 * | 2/2014 | Zhang et al. .............. 360/125.03 |
| 8,665,561 B1 | 3/2014 | Knutson et al. |
| 8,670,211 B1 | 3/2014 | Sun et al. |

(56) References Cited

U.S. PATENT DOCUMENTS

| | | |
|---|---|---|
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2003/0076630 A1 | 4/2003 | Sato et al. |
| 2004/0061988 A1 | 4/2004 | Matono et al. |
| 2004/0184191 A1 | 9/2004 | Ichihara et al. |
| 2005/0117251 A1 | 6/2005 | Matono et al. |
| 2005/0162778 A1 | 7/2005 | Kimura et al. |
| 2006/0044677 A1 | 3/2006 | Li et al. |
| 2006/0158779 A1 | 7/2006 | Ota et al. |
| 2006/0174474 A1 | 8/2006 | Le |
| 2006/0225268 A1 | 10/2006 | Le et al. |
| 2006/0288565 A1 | 12/2006 | Le et al. |
| 2007/0211380 A1 | 9/2007 | Akimoto et al. |
| 2007/0236834 A1 | 10/2007 | Toma et al. |
| 2007/0247746 A1 | 10/2007 | Kim et al. |
| 2007/0258167 A1 | 11/2007 | Allen et al. |
| 2007/0263324 A1 | 11/2007 | Allen et al. |
| 2007/0283557 A1 | 12/2007 | Chen et al. |
| 2008/0002309 A1 | 1/2008 | Hsu et al. |
| 2008/0151437 A1 | 6/2008 | Chen et al. |
| 2008/0232001 A1 | 9/2008 | Bonhote et al. |
| 2008/0273276 A1 | 11/2008 | Guan |
| 2008/0273277 A1 | 11/2008 | Guan et al. |
| 2009/0279206 A1 | 11/2009 | Yang et al. |
| 2010/0112486 A1 | 5/2010 | Zhang et al. |
| 2010/0146773 A1 | 6/2010 | Li et al. |
| 2010/0165517 A1 | 7/2010 | Araki et al. |
| 2010/0277832 A1 | 11/2010 | Bai et al. |
| 2010/0290157 A1 | 11/2010 | Zhang et al. |
| 2011/0051293 A1 | 3/2011 | Bai et al. |
| 2011/0086240 A1 | 4/2011 | Xiang et al. |
| 2011/0146060 A1 | 6/2011 | Han et al. |
| 2011/0151279 A1 | 6/2011 | Allen et al. |
| 2011/0205671 A1 | 8/2011 | Benakli et al. |
| 2011/0222188 A1 | 9/2011 | Etoh et al. |
| 2012/0111826 A1 | 5/2012 | Chen et al. |
| 2012/0162811 A1 | 6/2012 | Ishibashi et al. |
| 2012/0216378 A1 | 8/2012 | Emley et al. |
| 2012/0237878 A1 | 9/2012 | Zeng et al. |
| 2012/0268845 A1* | 10/2012 | Sahoo et al. .................. 360/318 |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

OTHER PUBLICATIONS

Jinquiu Zhang, et. al., U.S. Appl. No. 14/279,608, filed May 16, 2014, 36 pages.

Jinquiu Zhang, et. al., U.S. Appl. No. 14/229,297, filed Mar. 28, 2014, 30 pages.

Mallary, et al., "One Terabit per Square Inch Perpendicular Recording Conceptual Design", IEEE Transactions on Magnetics, vol. 38, No. 4, Jul. 2002, pp. 1719-1724.

Feng Liu, et. al., U.S. Appl. No. 14/051,359, filed Oct. 10, 2013, 17 pages.

* cited by examiner

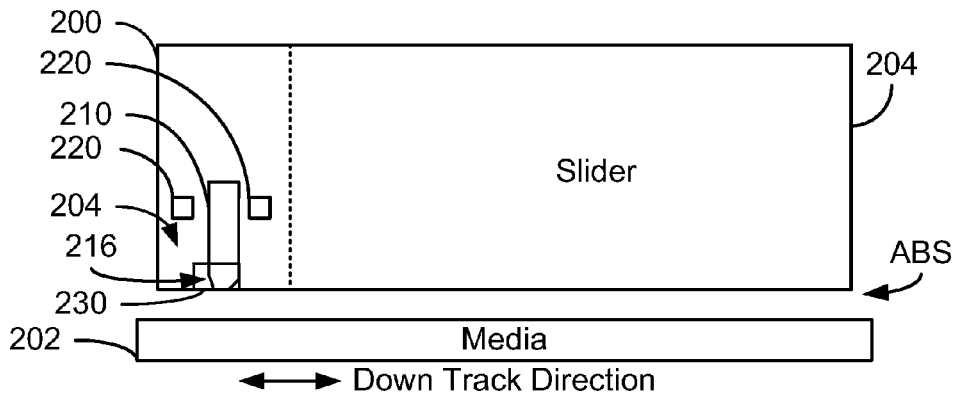
FIG. 3A
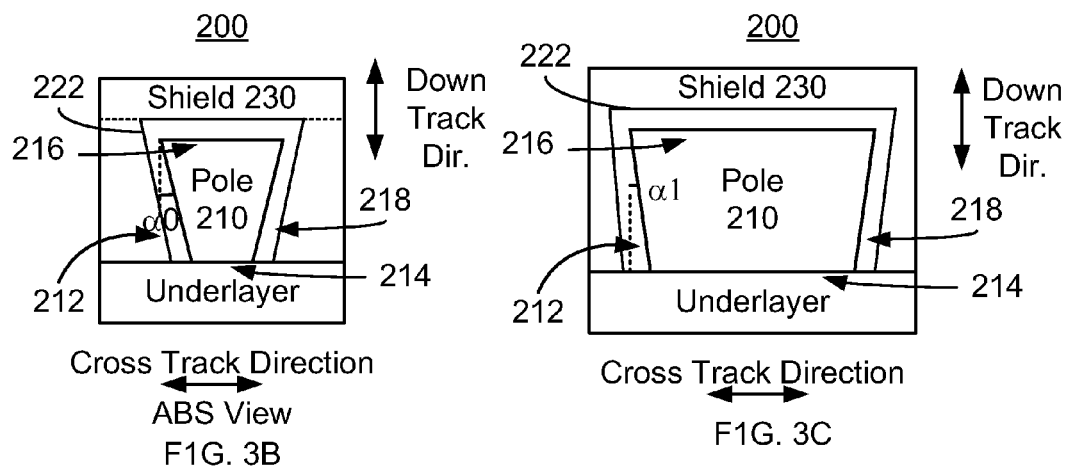
FIG. 3B
FIG. 3C
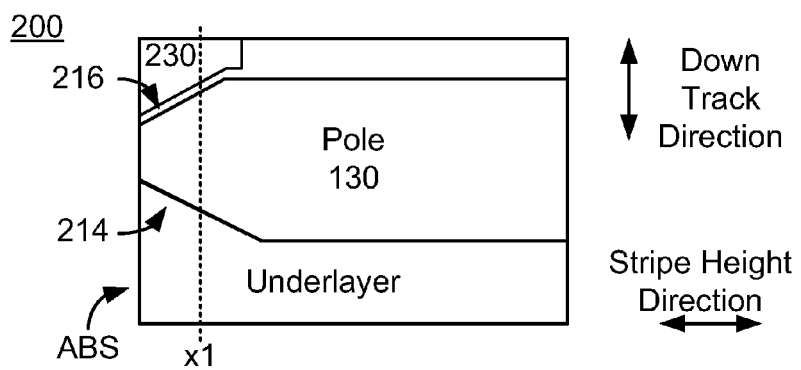
FIG. 3D

Side View

ABS View

Plan View

Side View

ABS View

Plan View

Side View

ABS View

Plan View

Side View

ABS View

Plan View

Side View

ABS View

Plan View

Side View

ABS View

Plan View

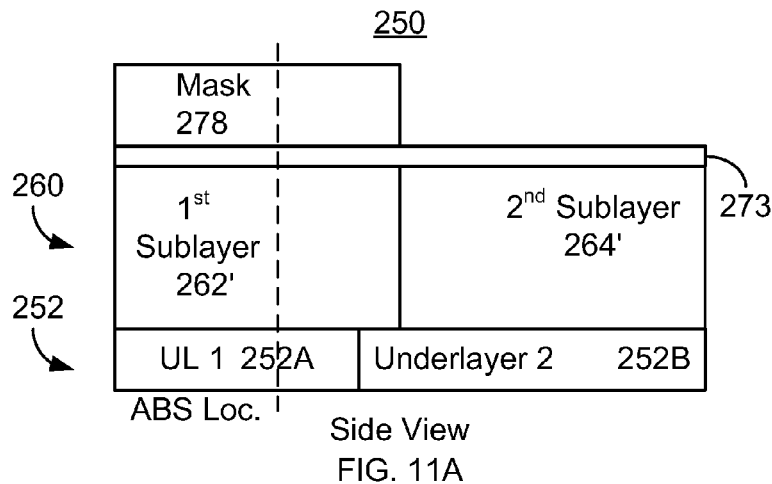
Side View
FIG. 11A
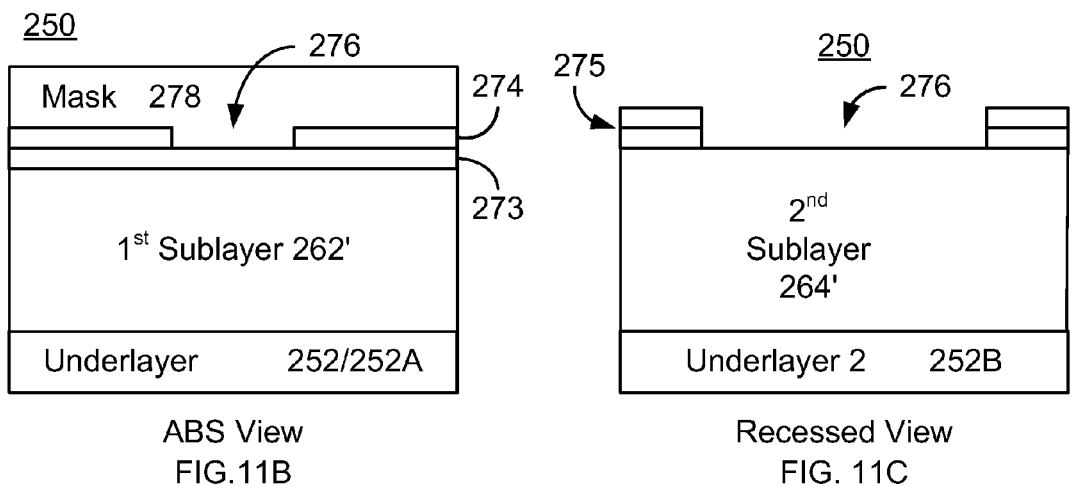
ABS View
FIG. 11B
Recessed View
FIG. 11C
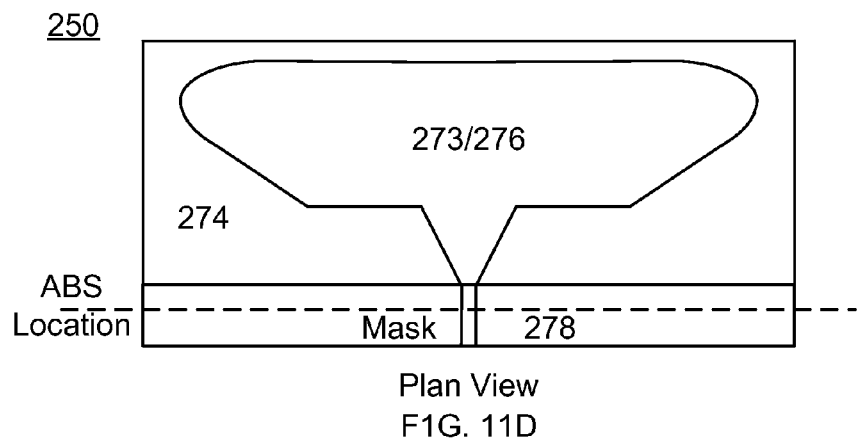
Plan View
FIG. 11D

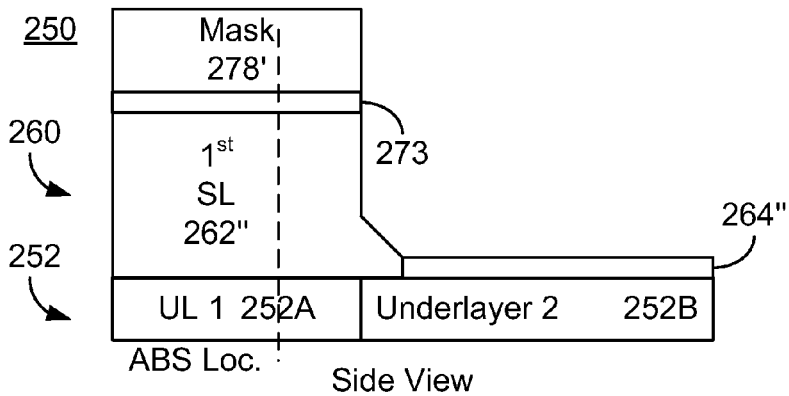
Side View
FIG. 12A
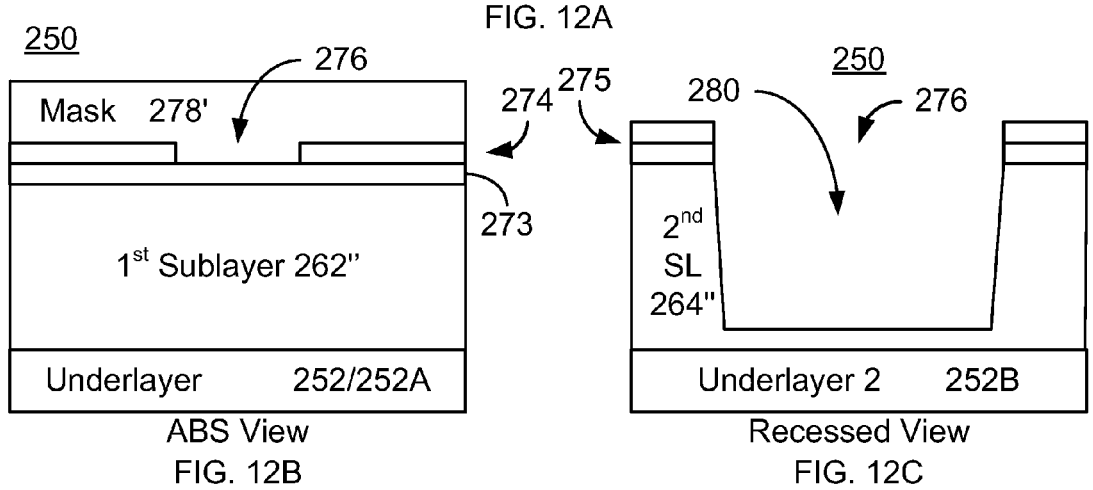
ABS View
FIG. 12B
Recessed View
FIG. 12C
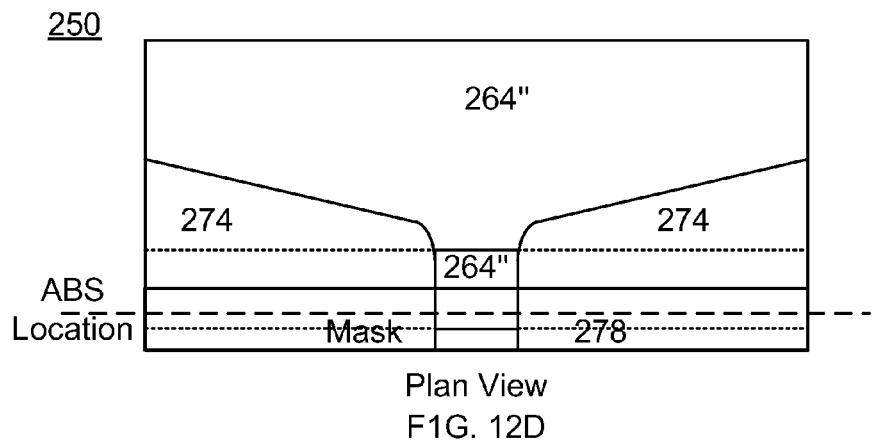
Plan View
FIG. 12D

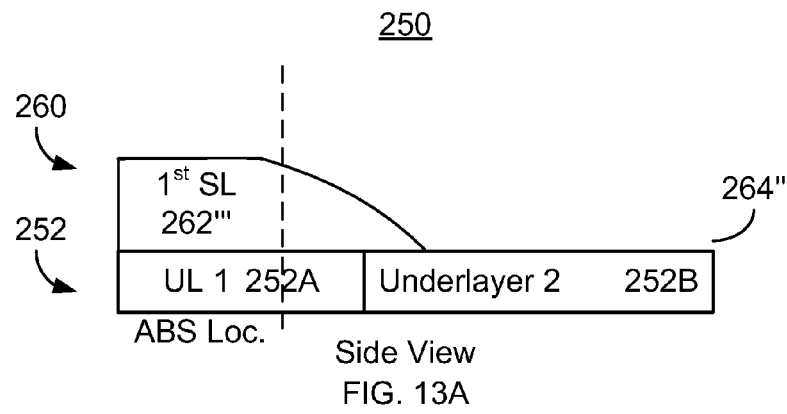
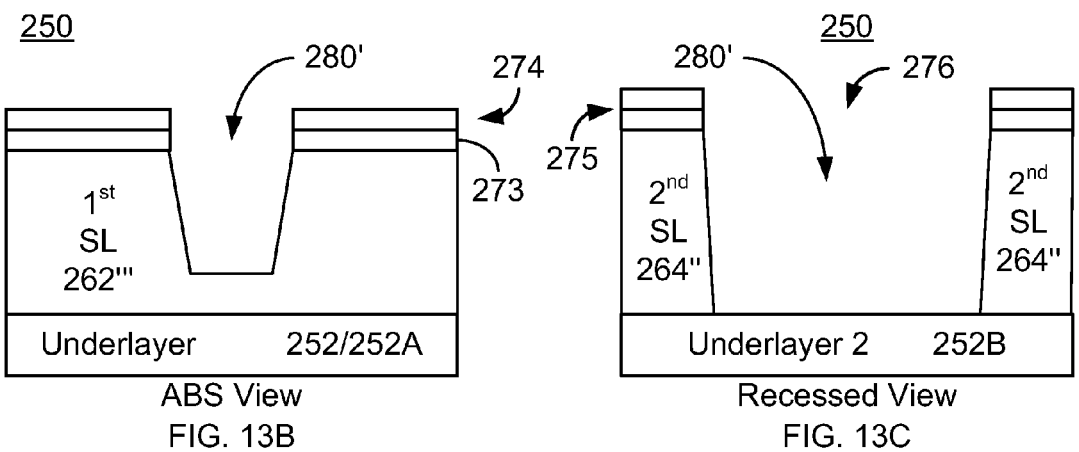
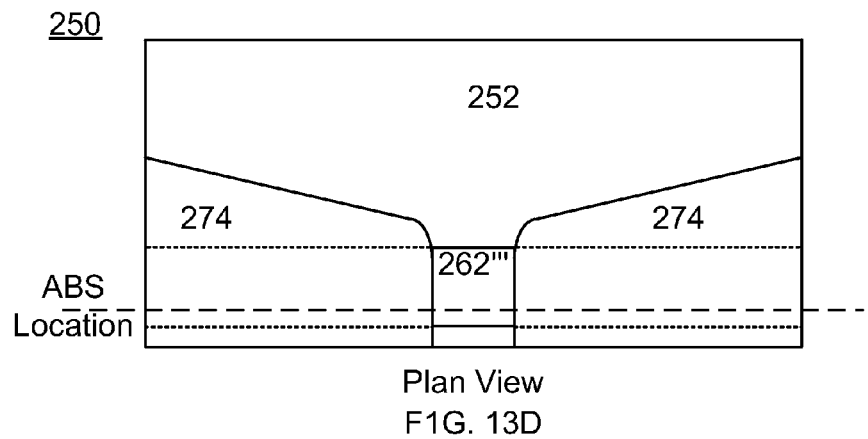

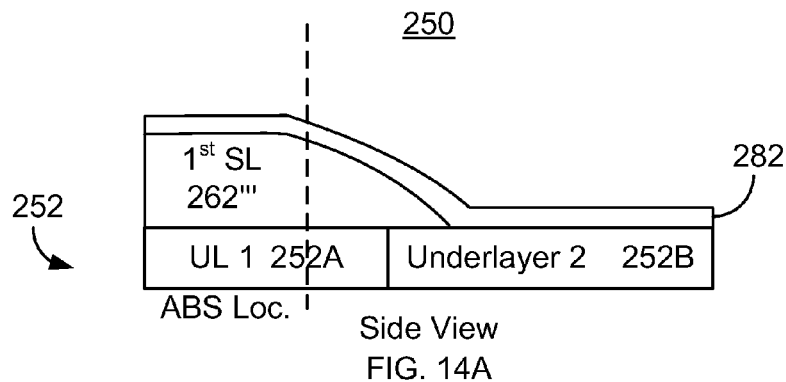
Side View
FIG. 14A
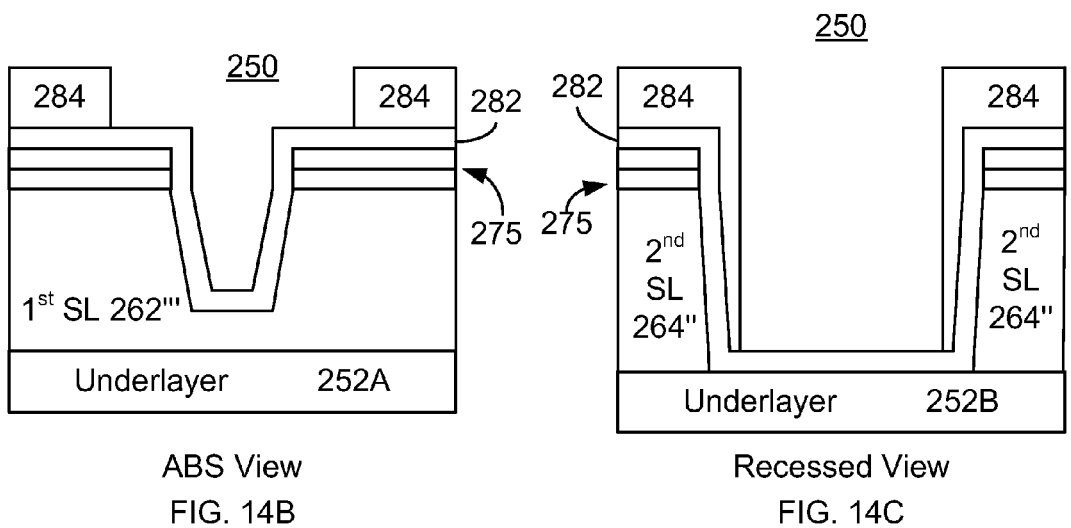
ABS View
FIG. 14B
Recessed View
FIG. 14C
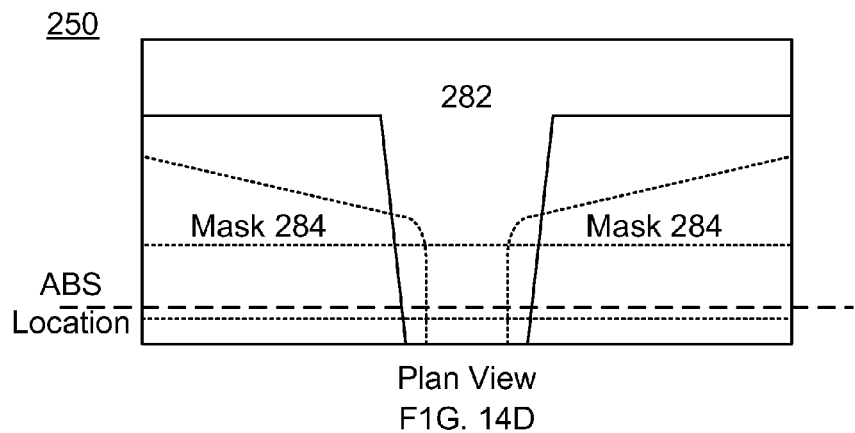
Plan View
FIG. 14D

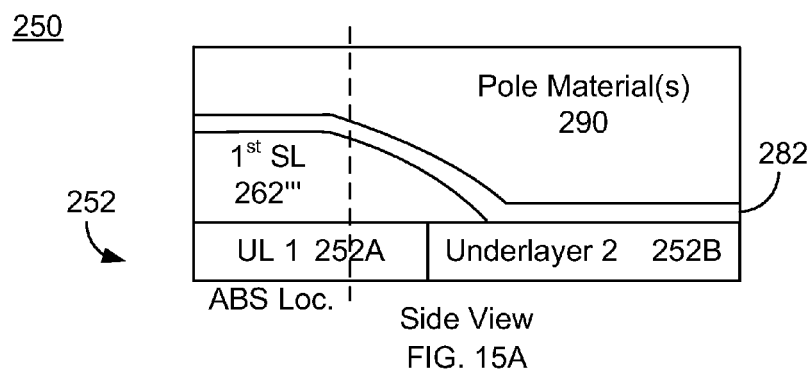
Side View
FIG. 15A
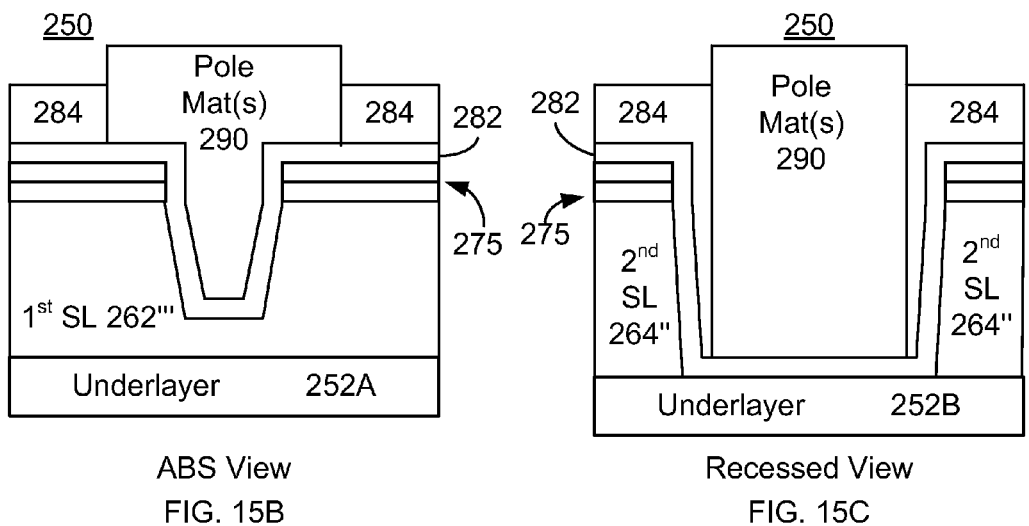
ABS View
FIG. 15B
Recessed View
FIG. 15C
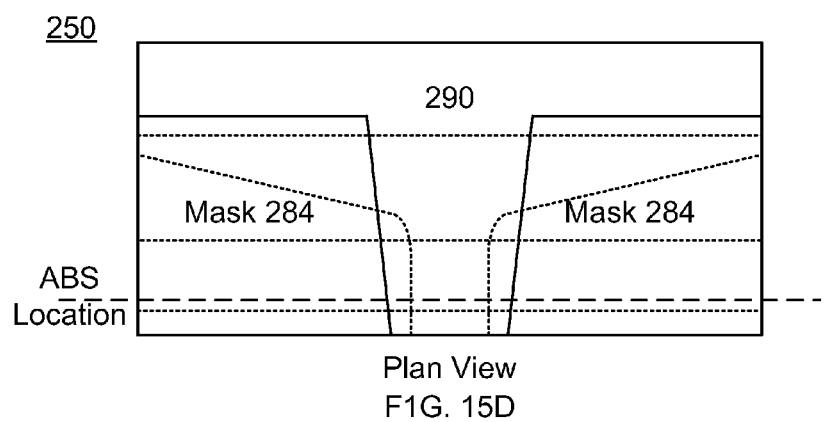
Plan View
FIG. 15D

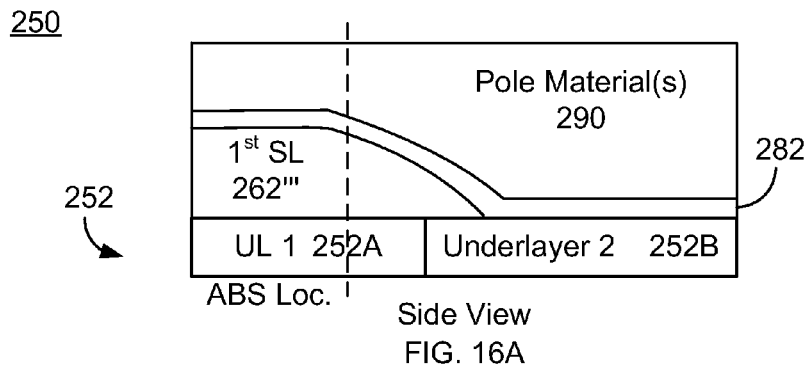
Side View
FIG. 16A
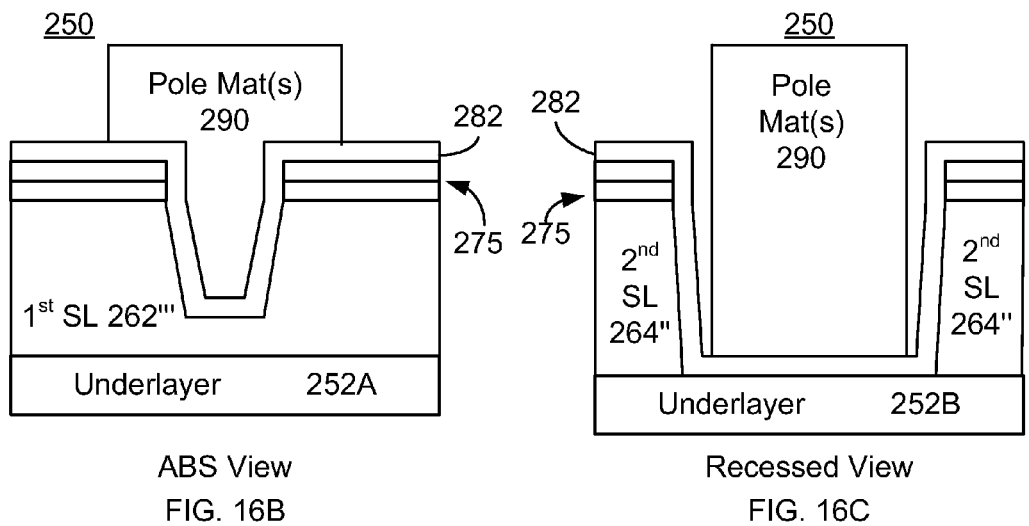
ABS View
FIG. 16B
Recessed View
FIG. 16C
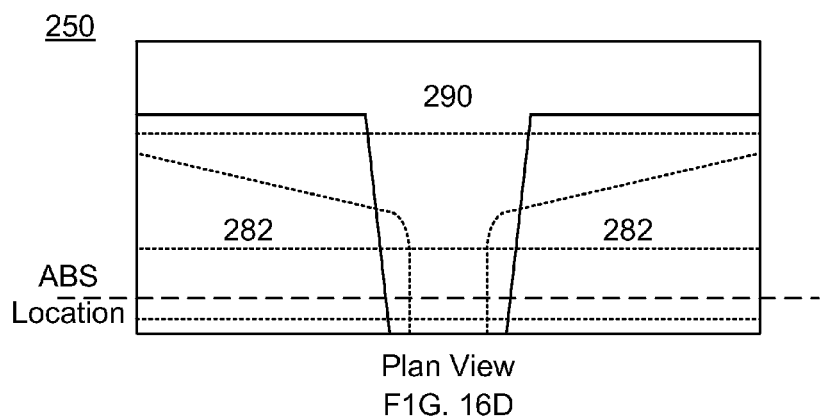
Plan View
FIG. 16D

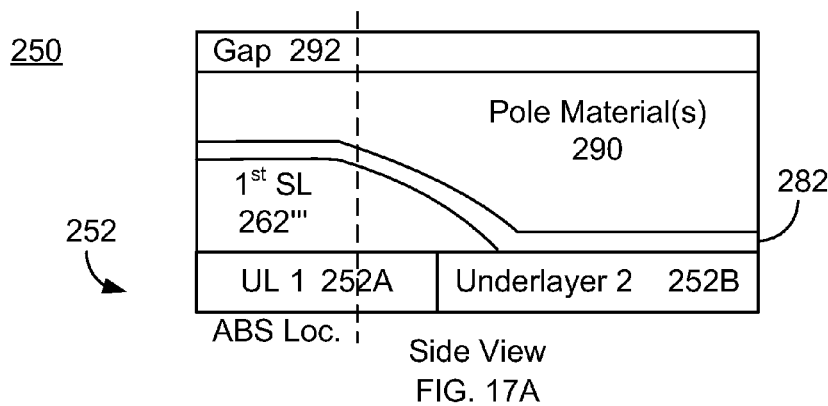
Side View
FIG. 17A
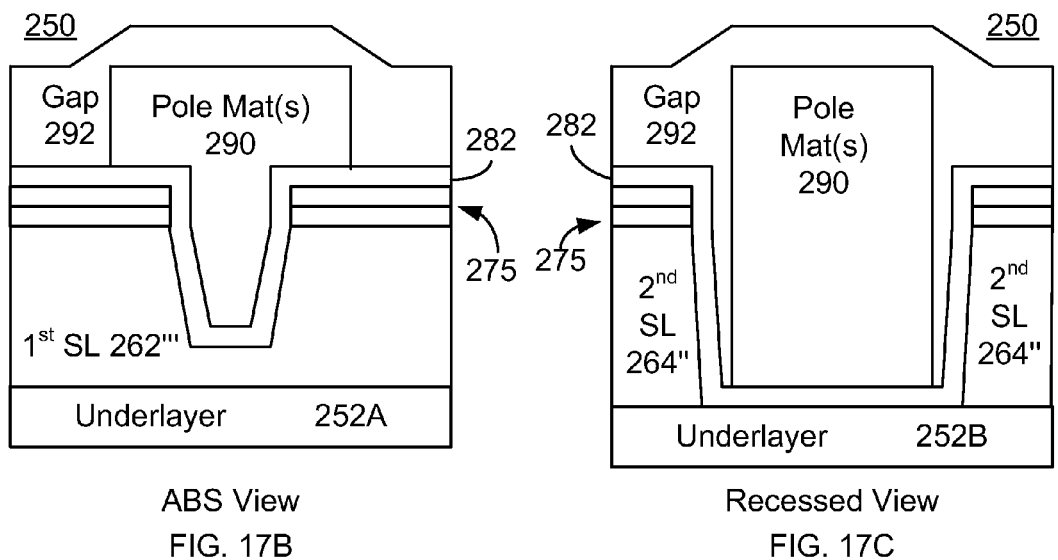
ABS View
FIG. 17B
Recessed View
FIG. 17C
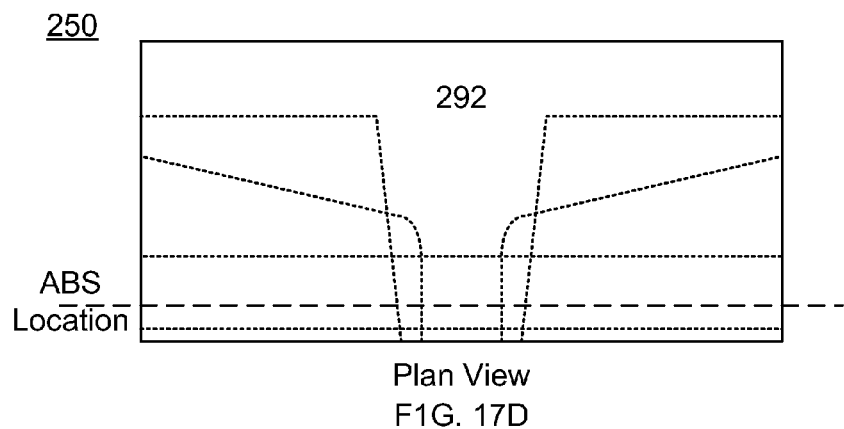
Plan View
FIG. 17D Side View ABS View Recessed View Plan View Side View ABS View Recessed View Plan View Side View ABS View Recessed View Plan View Side View ABS View Recessed View Plan View

METHOD FOR FABRICATING A MAGNETIC WRITER USING MULTIPLE ETCHES OF DAMASCENE MATERIALS

CROSS-REFERENCE TO RELATED APPLICATIONS

This application claims priority to provisional U.S. Patent Application Ser. No. 61/941,337, filed on Feb. 18, 2014, which is hereby incorporated by reference in its entirety.

BACKGROUND

FIG. 1 depicts an air-bearing surface (ABS) view of a conventional magnetic recording transducer 10. The magnetic recording transducer 10 may be a perpendicular magnetic recording (PMR) head. The conventional transducer 10 includes an underlayer 12, side gap 14, side shields 16, top gap 17, optional top, or trailing, shield 18 and main pole 20.

The main pole 20 resides on an underlayer 12 and includes sidewalls 22 and 24. The sidewalls 22 and 24 of the conventional main pole 20 form an angle α0 with the down track direction at the ABS. The side shields 16 are separated from the main pole 20 by a side gap 14. The side shields 16 extend at least from the top of the main pole 20 to the bottom of the main pole 20. The side shields 16 also extend a distance back from the ABS. The gap 14 between the side shields 16 and the main pole 20 may have a substantially constant thickness. Thus, the side shields 16 are conformal with the main pole 20.

Although the conventional magnetic recording head 10 functions, there are drawbacks. In particular, the conventional magnetic recording head 10 may not perform sufficiently at higher recording densities. For example, the write field of the conventional main pole 20 may not have a sufficiently high magnitude write field without introducing adjacent track interference (ATI) issues. Accordingly, what is needed is a system and method for improving the performance of a magnetic recording head.

BRIEF DESCRIPTION OF SEVERAL VIEWS OF THE DRAWINGS

FIGS. 3A, 3B, 3C and 3D depict side, ABS, yoke and apex views of an exemplary embodiment of a magnetic recording disk drive.

DETAILED DESCRIPTION OF THE PREFERRED EMBODIMENTS

Figure 1:
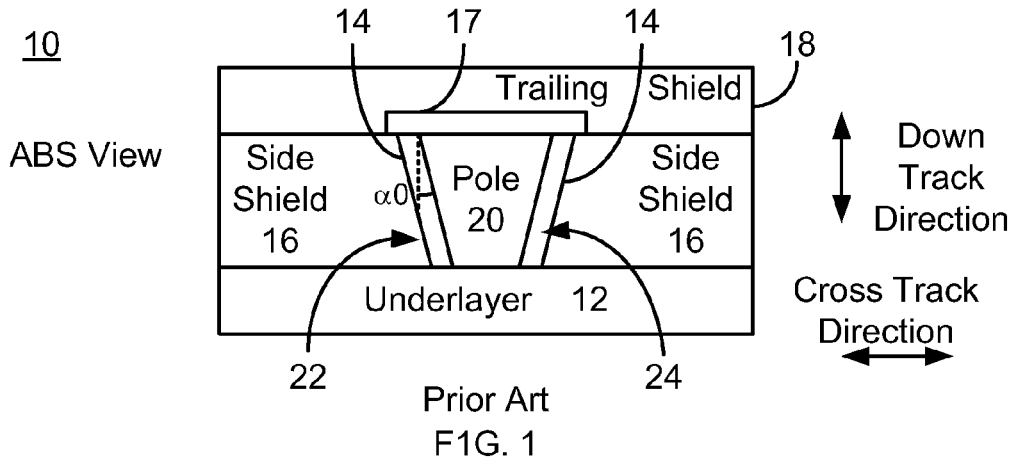
FIG. 1 depicts an ABS view of a conventional magnetic recording head.
Figure 2:
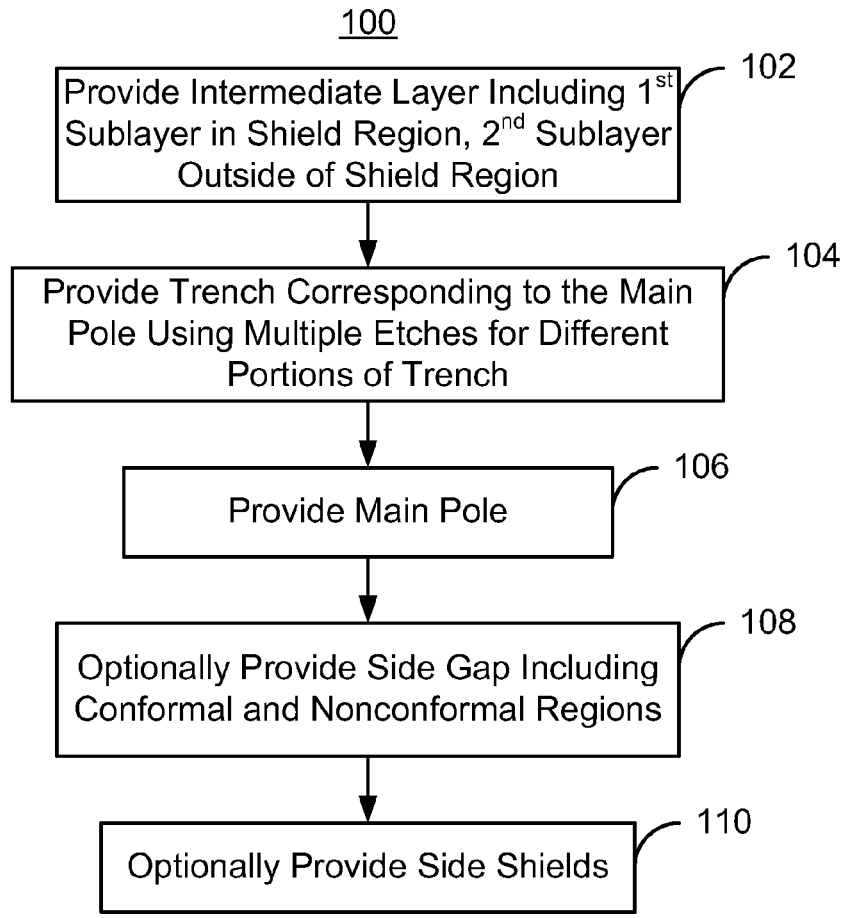
FIG. 2 depicts a flow chart of an exemplary embodiment of a method for providing a magnetic recording transducer.

FIG. 2 depicts an exemplary embodiment of a method 100 for providing a magnetic recording transducer. For simplicity, some steps may be omitted, interleaved, performed in another order and/or combined. The method 100 is described in the context of providing a single magnetic recording disk drive and transducer. However, the method 100 may be used to fabricate multiple magnetic recording transducers at substantially the same time. The method 100 is also described in the context of particular layers. A particular layer may include multiple materials and/or multiple sub-layers. The method 100 also may start after formation of other portions of the magnetic recording head. For example, the method 100 may start after a read transducer, return pole/shield and/or other structure have been fabricated.

An intermediate layer including multiple sublayers is provided, via step 102. Step 102 includes providing a first sublayer and a second sublayer. The first sublayer is provided in at least the side shield region. The side shield region includes the area in which the side shield(s) are to be fabricated. The side shield region also includes a portion of the location at which the air-bearing surface (ABS location) is formed. The second sublayer may be provided in the region outside of the shield region. In some embodiments, step 102 includes full film depositing the material(s) for the first sublayer, then removing a portion of the materials to form the first sublayer. The material(s) for the second sublayer are then provided, for example via deposition and planarization to remove excess material. Thus, the intermediate layer that includes the first and second sublayers and that has a substantially flat top surface is formed.

A trench is formed in an intermediate layer using multiple etches, via step 104. A first etch performed in step 104 removes a portion of the second sublayer. A first portion of the trench may thus be provided. This first portion of the trench has a first sidewall angle. A second etch removes a portion of the first sublayer. A second portion of the trench having a second sidewall angle is thus formed. The second sidewall angle in the second portion of the trench is greater than the first sidewall angle. The second portion of the trench includes an additional portion of the ABS location. The trench is, therefore, formed such that the trench has different sidewall angles in different portions of the pole. The first etch may be performed on the second sublayer located in a region corresponding to the yoke, while the second etch may be performed on the first sublayer corresponding to the pole tip, including ABS location. In some embodiments, the pole tip is masked during the first etch and the yoke region covered by a mask during the second etch. In other embodiments, the yoke region may be uncovered during the second etch. In some such embodiments, the second etch of the pole tip region may also etch the yoke region. In other such embodiments, the second etch of the pole tip region is configured to leave the yoke region substantially unchanged. For example, the first sublayer in the yoke region may be made of a different material than the second sublayer in the pole tip region. This different material may not be removed by the etch chemistry used to form the trench in the pole tip region. In other embodiments, the pole tip region of the trench may be formed by the first etch, while the yoke region of the trench is formed by second etch.

The main pole is provided in the trench, via step 106. In some embodiments, step 104 includes depositing a seed layer, such as Ru and/or magnetic seed layer(s). High saturation magnetization magnetic material(s) are also provided. For example, such magnetic materials may be plated and/or vacuum deposited. Step 104 also includes planarizing the magnetic materials and, in at least some embodiments, forming leading and/or trailing edge bevels. The main pole formed in step 104 has sidewalls that have the second sidewall angle in the second portion of the trench and sidewall angles that correspond to the first sidewall angle in the first portion of the trench. Thus, the main pole is conformal with the trench in the second portion of the trench but may be nonconformal in the first portion of the trench recessed from the ABS. In some embodiments, the main pole has sidewall angles of at least twelve and not more than sixteen degrees in the second portion of the trench, which includes the ABS location. The main pole has a sidewall angle of at least zero degrees and not more than five degrees in the first portion of the trench. In some embodiments, the pole may have leading and/or trailing surface bevels.

A side gap that may include conformal and nonconformal regions is optionally provided, via step 108. Part of step 108 may be performed in step 106. Some or all of step 108 may also be performed before step 106. For example, a nonmagnetic seed layer, such as Ru described above, may form all or part of the side gap provided in step 108. Such a seed layer may be the conformal portion of the side gap. An side additional gap layer may also be provided. In some such embodiments, this additional side gap layer is recessed from the ABS and may be used to form all or part of the nonconformal side gap.

Side shield(s) may also be optionally provided, via step 110. The side shields may be provided by removing a portion of the intermediate layer around the pole at and near the ABS location. A soft magnetic material, such as NiFe may then refill this region, forming the side shield(s). In some embodiments, step 110 include forming a wraparound shield of which the side shields are a part.

Using the method 100, a magnetic transducer having improved performance may be fabricated. For example, the sidewall angles of the pole may vary because of the manner in which the trench is formed. This may be achieved while exposing the ABS to only a single etch in forming the trench. In addition, a nonconformal side gap might be provided. This may also improve performance of the transducer. These benefits may be achieved without significantly complicating processing. Thus, performance of the disk drive may be improved.

FIGS. 3A, 3B, 3C and 3D depict various views of a transducer 200 fabricated using the method 100. For clarity, FIGS. 3A-3D are not to scale. FIG. 3A depicts a side view of a disk drive including the transducer 200. FIGS. 3B, 3C and 3D depict ABS, recessed ("yoke") and side (apex) views of the transducer 200. The recessed/yoke view shown in FIG. 3C may be taken at location x1 in FIG. 3D. For simplicity not all portions of the disk drive and transducer 200 are shown. In addition, although the disk drive and transducer 200 are depicted in the context of particular components other and/or different components may be used. For example, circuitry used to drive and control various portions of the disk drive is not shown. For simplicity, only single components are shown. However, multiples of each components and/or their sub-components, might be used. The disk drive 200 may be a perpendicular magnetic recording (PMR) disk drive. However, in other embodiments, the disk drive 200 may be configured for other types of magnetic recording included but not limited to heat assisted magnetic recording (HAMR).

The disk drive includes a media 202 and a slider 204 including a transducer 200. The slider 204 and transducer 200 have an ABS formed at the ABS location described above. For example, the slider 204 may be lapped to the ABS during fabrication. An underlayer 202, intermediate layer 204, main pole 210, coil 220, gap 222 and shield 230 are shown. The underlayer 202 may include a bottom (or leading edge) shield. The intermediate layer 204 may have included multiple sublayers, at least some of which may have been removed during fabrication. The main pole 210 includes a leading surface 214, a trailing surface 216 and sidewalls 214 and 218. The leading surface 214 is a leading edge bevel. The trailing surface 216 is a trailing bevel 216. In FIG. 3A one turn and one layer of turns is depicted for the coil 220. Another number of turns and/or another number of layers may, however, be used. Note that only a portion of the coil(s) 220 may be considered to be shown in FIG. 3A. If, for example, the coil(s) 220 is a spiral, or pancake, coil, then additional portions of the coil(s) 220 may be located further from the ABS. Further, additional coils may also be used.

As can be seen in FIGS. 3B-3C, the geometry of the pole 210 changes with distance from the ABS. For example, the main pole 210 is wider in the recessed view than in the ABS view. The sidewalls 212 and 218 of the main pole also form sidewall angles $\alpha 0$ and $\alpha 1$, with the down track direction. The sidewall angles, $\alpha 0$ and $\alpha 1$, differ. Thus, the sidewall angles of the main pole 210 may also change with distance from the ABS. In some embodiments, $\alpha 0$ is at least twelve degrees and not more than sixteen degrees. The sidewall angle is larger at the ABS than recessed from the ABS. Although $\alpha 1$ is shown as nonzero, in some embodiments, the sidewall angle for the main pole 210 is zero degrees (substantially vertical sidewalls). For example, a1 may be at least zero degrees and not more than five degrees. In some such embodiments, a1 is not more than three degrees. Thus, the sidewall angles may decrease to zero as the distance from the ABS increases. In some embodiments, the sidewall angle goes to zero at least fifteen nanometers and not more than thirty nanometers from the ABS. However, in other embodiments, the sidewall angle may reach zero degrees at a different distance from the ABS. For example, the sidewall angle may go to zero degrees up to two hundred nanometers from the ABS.

In addition, the portion of the side gap 222 shown is conformal. In some embodiments, the entire side gap 222 is conformal to the pole. However, in other embodiments, the side gap 222 may have nonconformal portions.

Using the method 100, a magnetic transducer 200 having improved performance may be fabricated. For example, the sidewall angles of the pole may vary. This may be achieved while exposing the ABS to only a single etch in forming the trench. In addition, a nonconformal side gap might be provided. This may also improve performance of the transducer 200. These benefits may be achieved without significantly complicating processing. Thus, performance of the disk drive may be improved.

Figure 4:
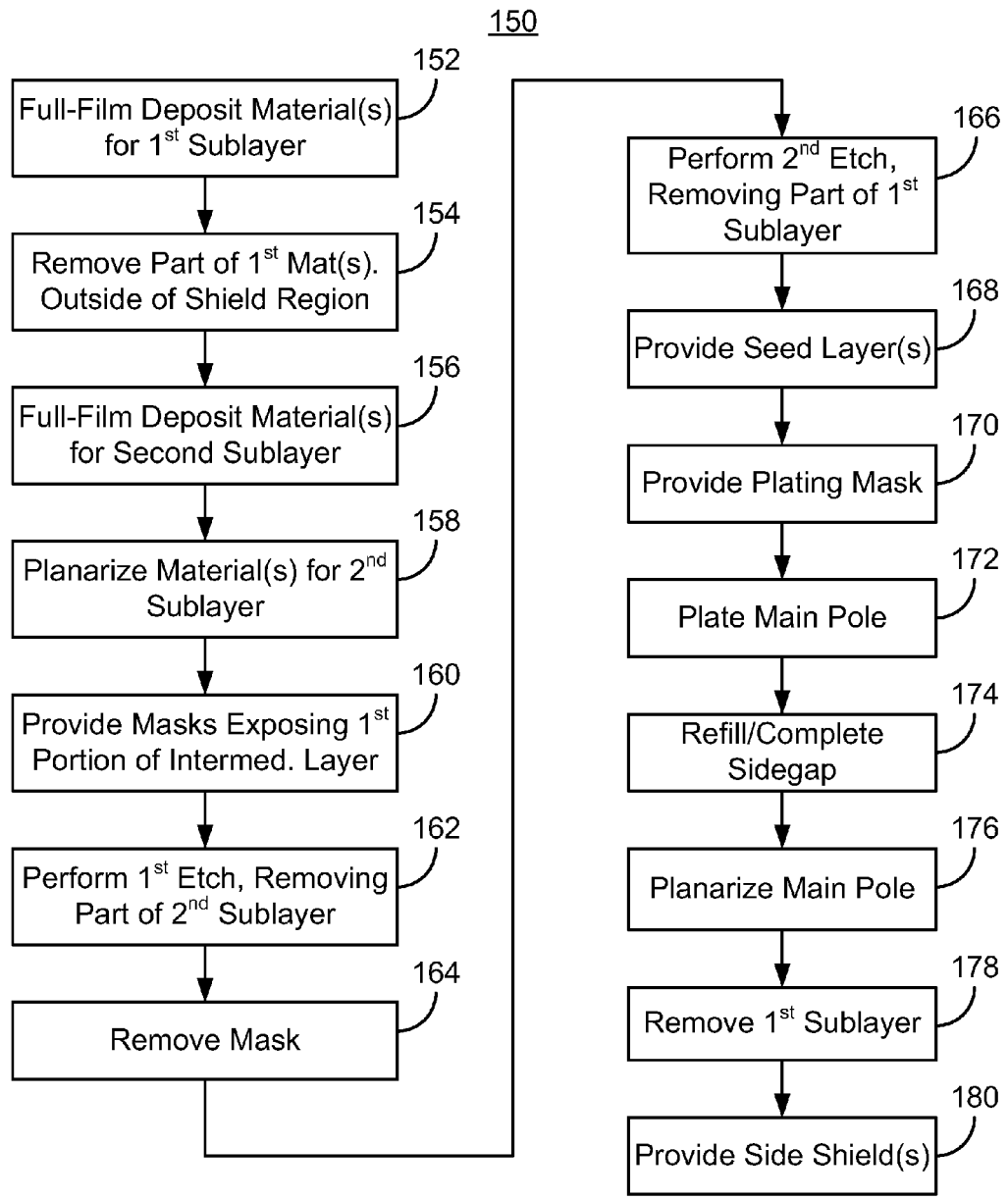
FIG. 4 depicts a flow chart of another exemplary embodiment of a method for providing a magnetic recording transducer.

FIG. 4 depicts an exemplary embodiment of a method 150 for providing a pole for a magnetic recording transducer having a main pole having varying sidewall angles and/or a side gap having conformal and nonconformal regions. For simplicity, some steps may be omitted, interleaved, and/or combined. The method 150 is also described in the context of providing a magnetic recording transducer 250 depicted in FIGS. 5A-5C though FIGS. 21A-21D depict an exemplary embodiment of a transducer 250 during fabrication using the method 150. The method 150 may be used to fabricate multiple magnetic recording heads at substantially the same time. The method 150 may also be used to fabricate other magnetic recording transducers. The method 150 is also described in the context of particular layers. A particular layer may include multiple materials and/or multiple sub-layers. The method 150 also may start after formation of other portions of the magnetic recording transducer. For example, the method 150 may start after a read transducer, return pole/shield and/or other structure have been fabricated.

Figure 5A:
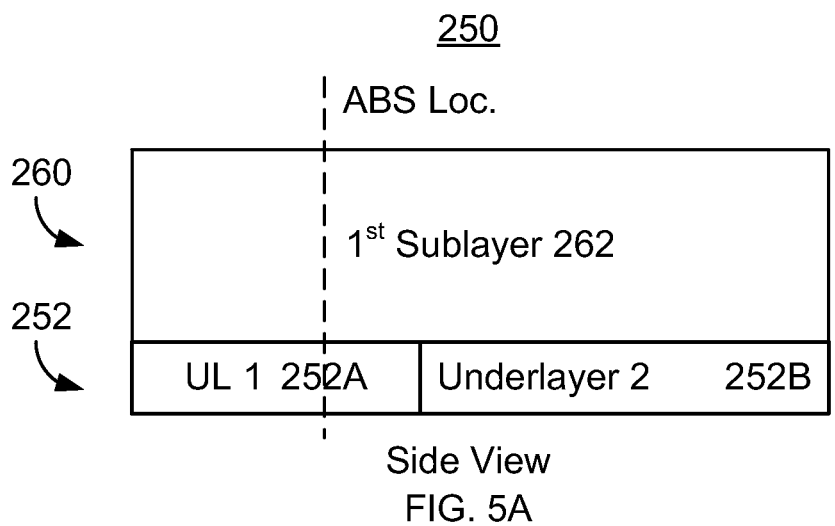
FIGS. 5A-5C through 21A-21D depict various views of an exemplary embodiment of a magnetic recording transducer during fabrication.
Figure 5B:
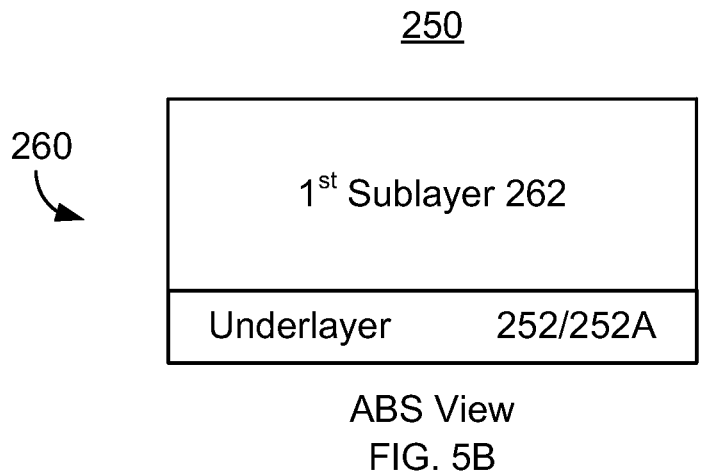
Figure 5C:
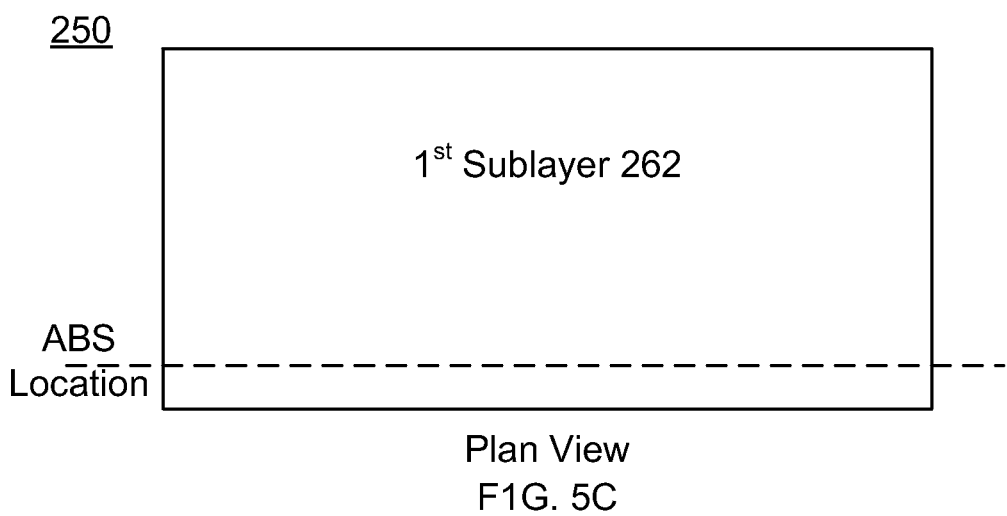

First material(s) for the intermediate layer are provided via full-film deposition, via step 152. This step may include full film depositing aluminum oxide or another layer on an underlayer. FIGS. 5A, 5B and 5C depict apex/side, ABS and plan views of the transducer 250 after step 152 is performed. Thus, the materials 262 for the first sublayer have been full film deposited on the underlayer 252. The underlayer 252 includes two portions 252A and 252B. First underlayer portion 252A may be a leading shield and include soft magnetic material(s) such as NiFe. The second underlayer portion 252B may be a nonmagnetic material such as Ru. The first sublayer 262 is to form part of an intermediate layer 260.

Figure 6A:
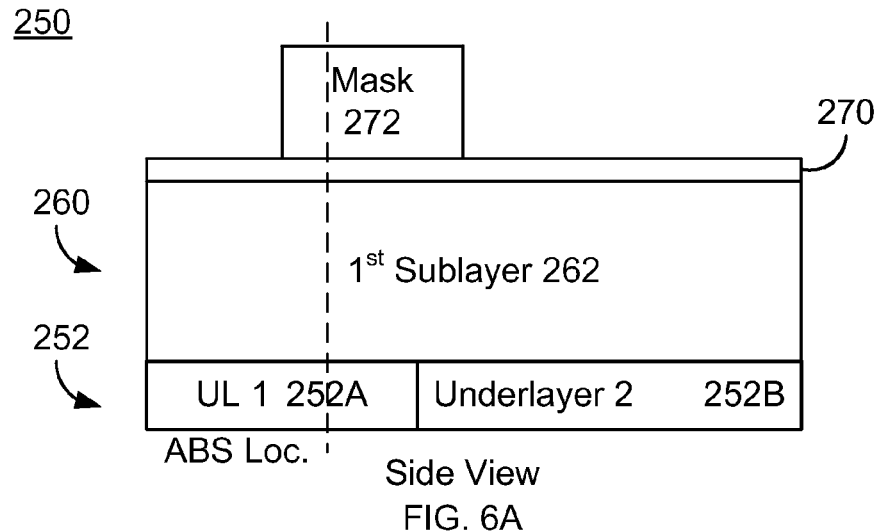
Figure 6B:
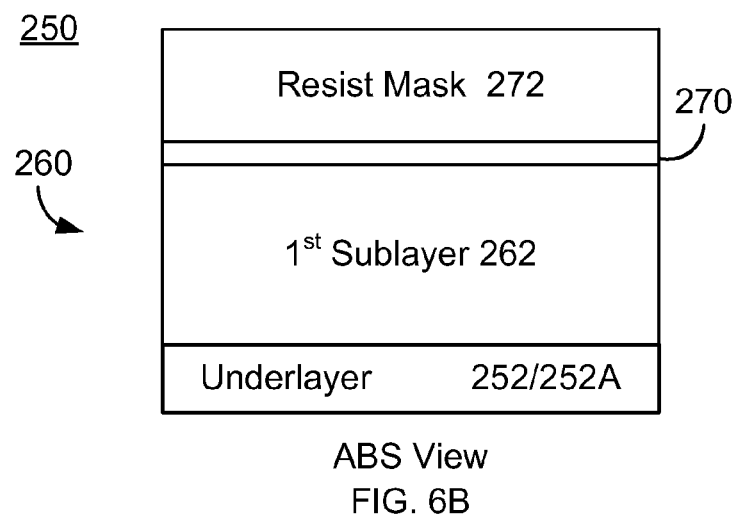
Figure 6C:
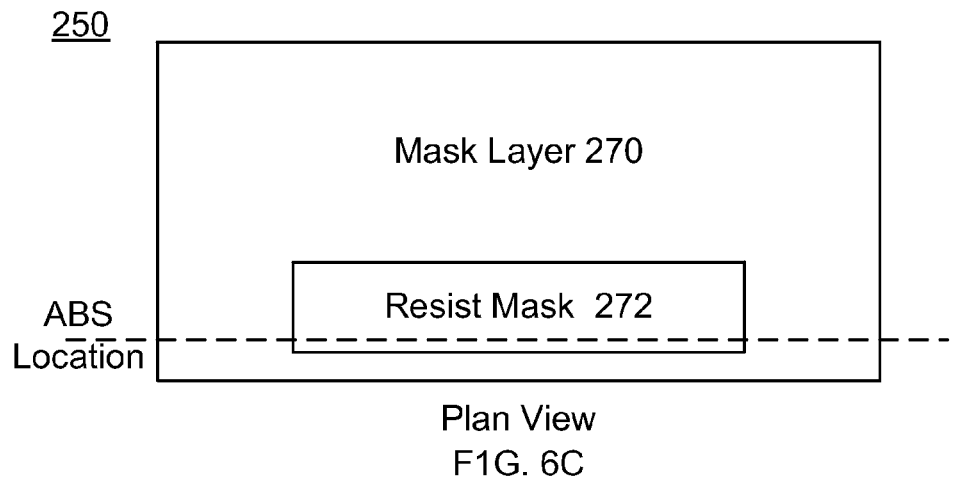
Figure 7A:
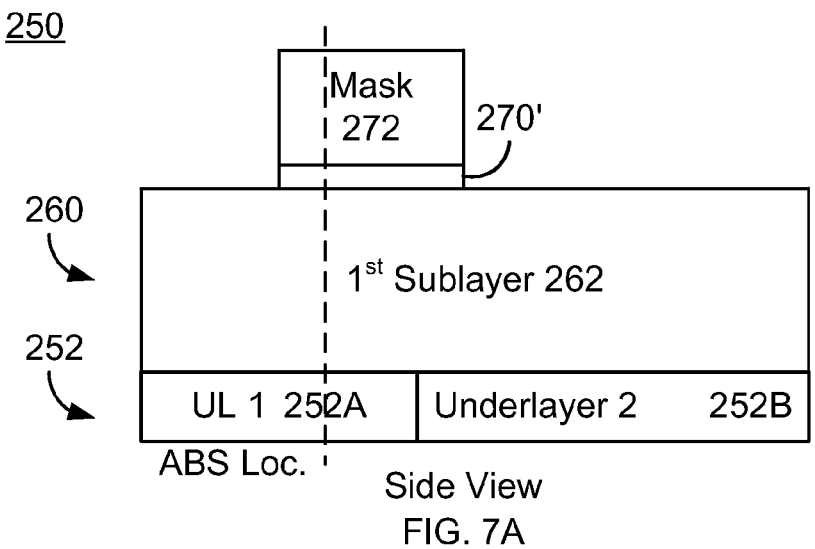
Figure 7B:
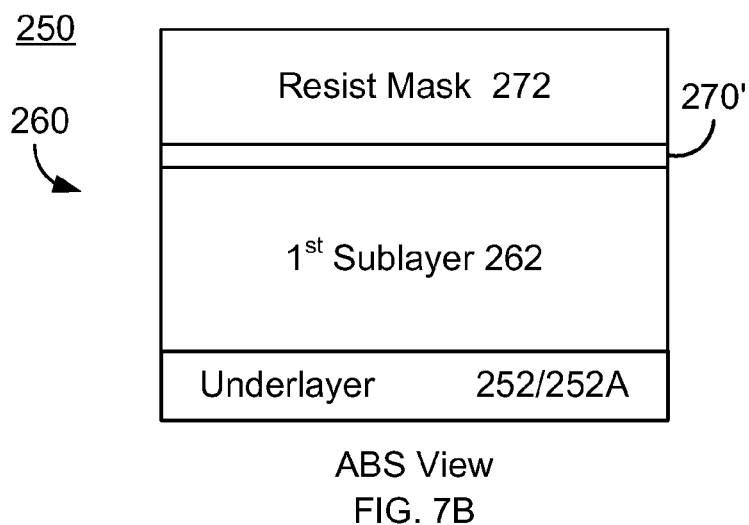
Figure 7C:
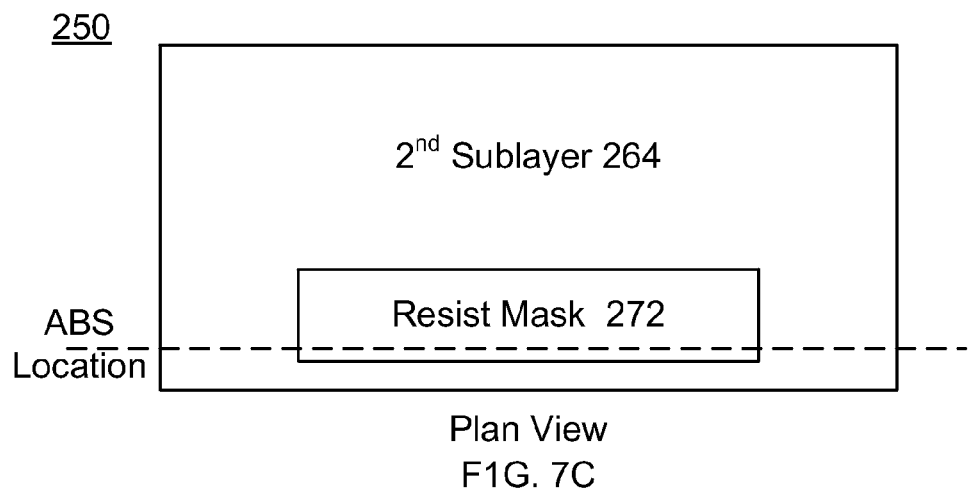
Figure 8A:
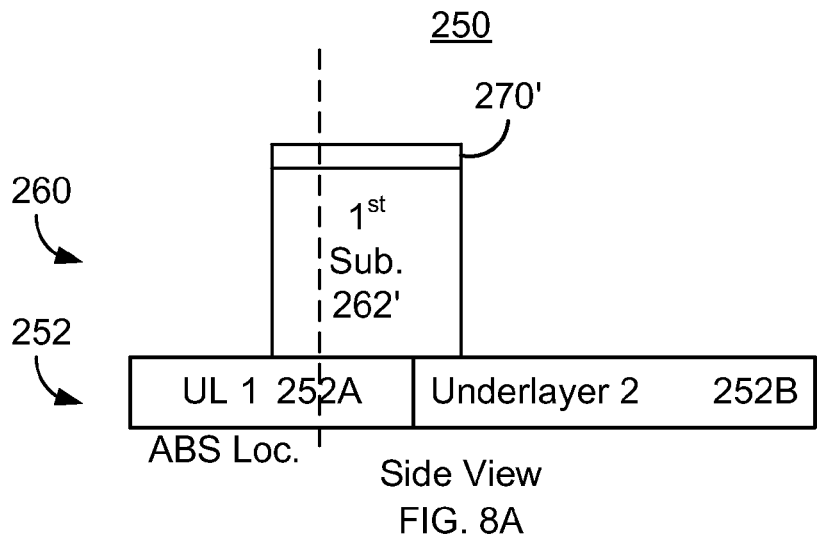
Figure 8B:
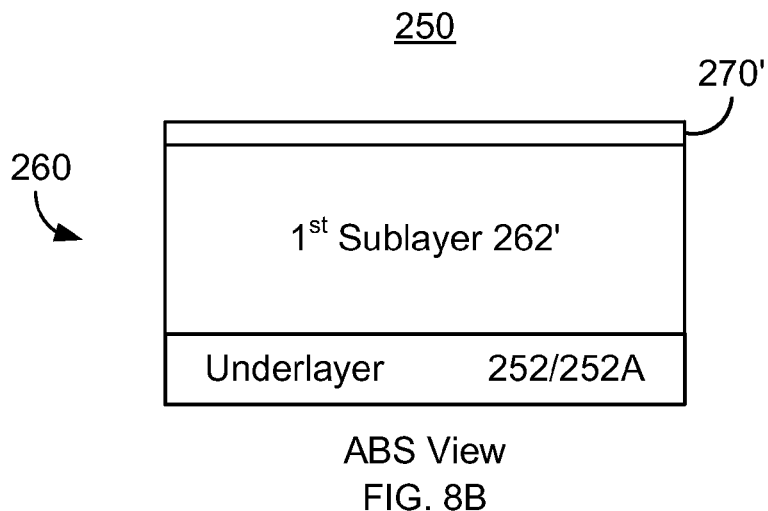
Figure 8C:
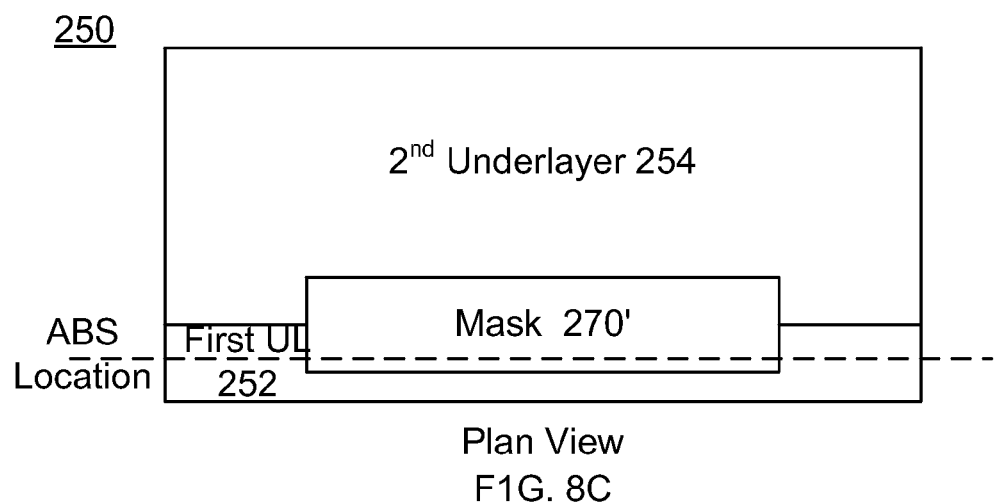

A first portion of the material(s) for the first sublayer outside of the shield region are removed, via step 154. The side shield region includes part of the ABS. Step 154 may include providing a mask that covers the side shield region and then removing the exposed portion of the material(s) for the first sublayer. FIGS. 6A, 6B and 6C depict side, ABS and plan views, respectively, of the transducer during step 154. Thus, a hard mask layer 270 and a photoresist mask 272 have been provided. The hard mask layer may be a Cr layer. FIGS. 7A, 7B and 7C depict side, ABS and plan views, respectively, of the transducer during step 154 after the exposed portion of the hard mask layer 270 have been removed, leaving hard mask 270'. The exposed portions of the hard mask layer 270 may have been removed using a reactive ion etch (RIE). FIGS. 8A, 8B and 8C depict side, ABS and plan views, respectively, of the transducer after step 154 has been completed. Thus, the first sublayer 262' remains in the shield region. The underlayer 252A/252B have been exposed.

Figure 9A:
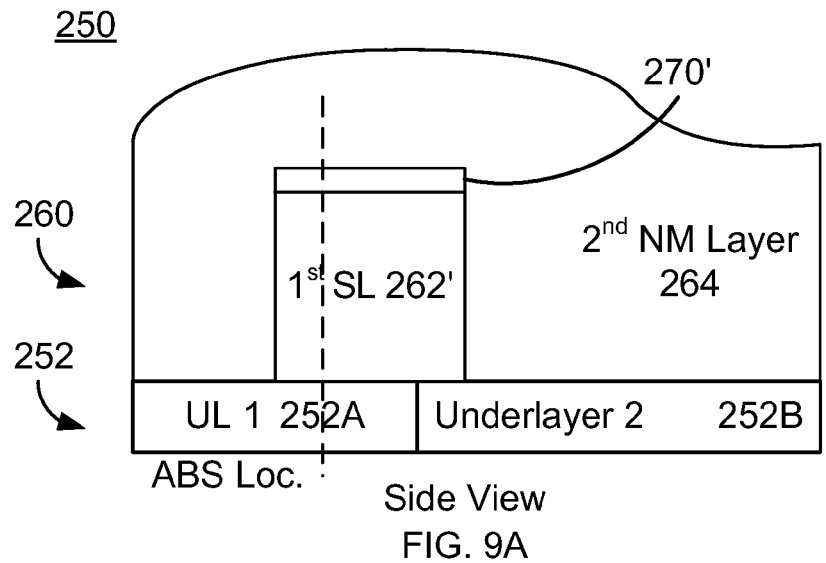
Figure 9B:
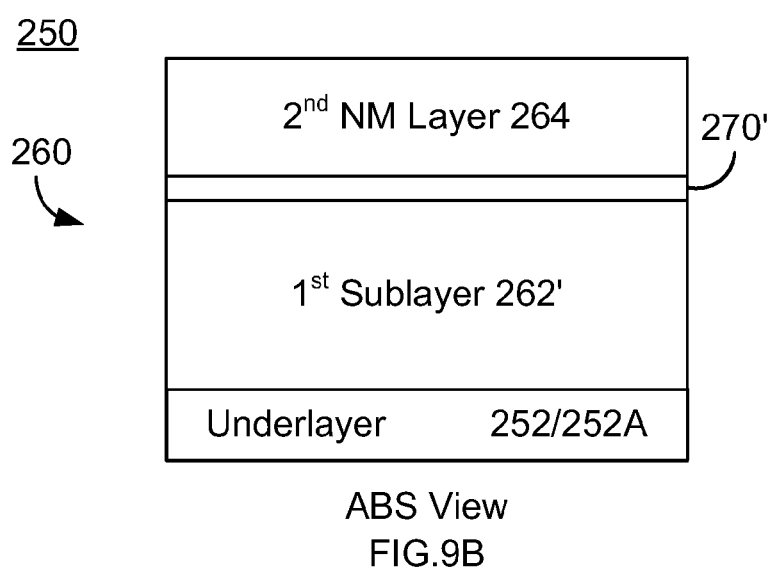
Figure 9C:
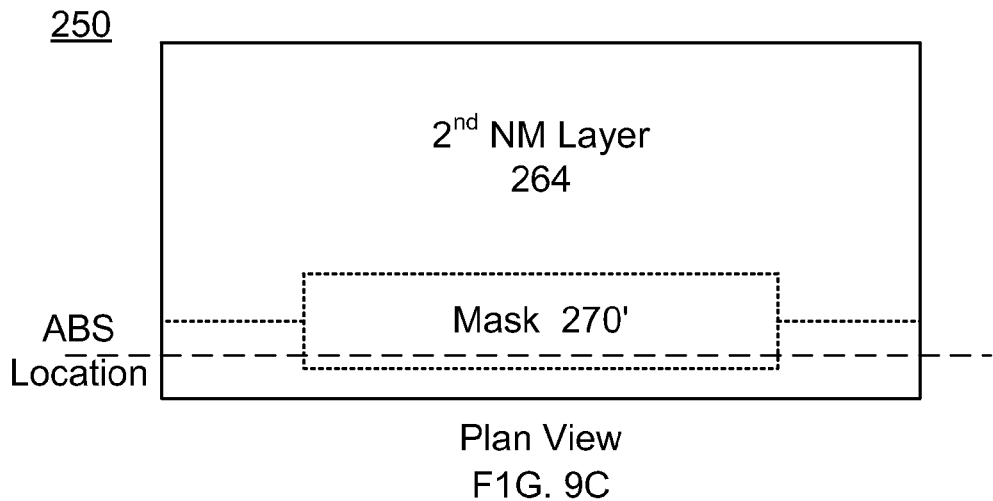

The material(s) for the second sublayer are full-film deposited, via step 156. For example, silicon oxide may be provided in step 156. FIGS. 9A, 9B and 9C depict side, ABS and plan views, respectively, of the transducer after step 156 has been completed. Thus, a second sublayer material(s) 264 have been deposited.

Figure 10A:
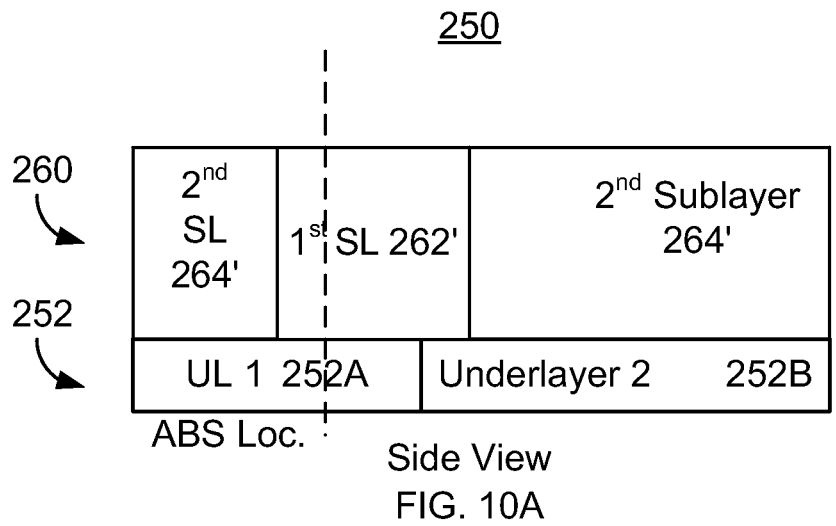
Figure 10B:
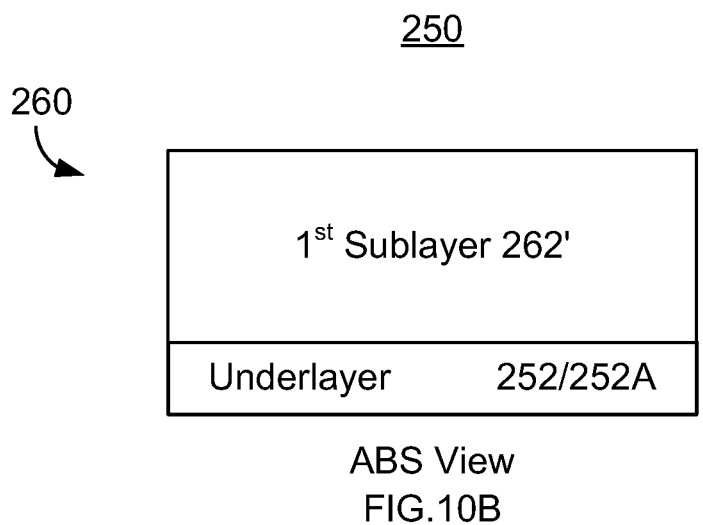
Figure 10C:
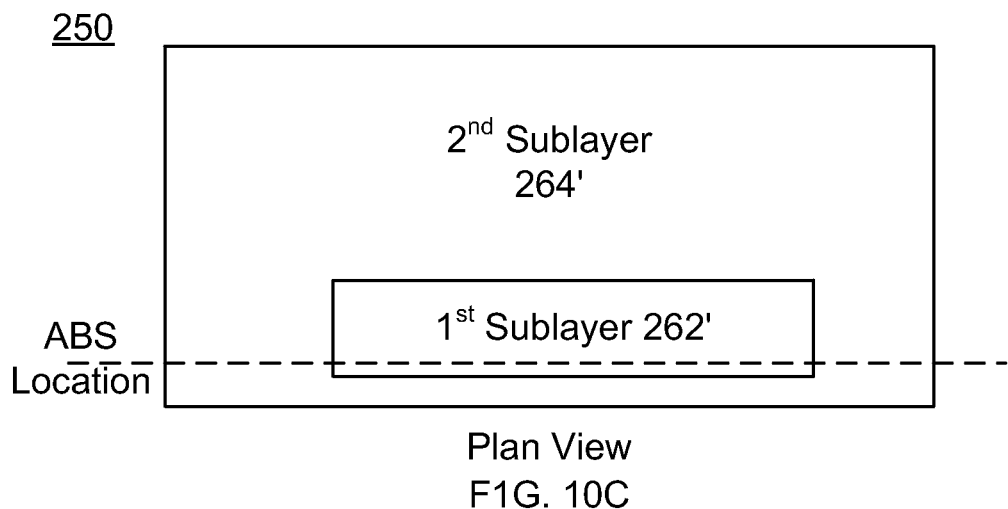

At least the second sublayer material(s) 264 are then planarized, via step 158. A chemical mechanical planarization (CMP) that exposes the first sublayer 262' is performed in step 158. FIGS. 10A, 10B and 10C depict side, ABS and plan views, respectively, of the transducer after step 158 has been completed. Thus, the first sublayer 262' in the shield region and the second sublayer 264' outside of the shield region have been formed from the remaining portions of layers 262 and 264, respectively. Steps 152-158 may thus be considered to form the intermediate layer 260.

A mask is provided on the intermediate layer 260, via step 160. The mask covers the first sublayer 262' and exposed a part of the second sublayer 264' In some embodiments the mask includes at least one hard mask as well as a photoresist mask. FIGS. 11A, 11B, 11C and 11D depict side, ABS, recessed and plan views, respectively, of the transducer after step 160 has been completed. Thus, a first hard mask layer 273 and a second hard mask 274 have been provided. The second hard mask 274 has an aperture 276 that has a shape and location corresponding to the pole. The layers 273 and 274 together form hard mask 275. Also shown is mask 278 that covers at least the first sublayer 262'.

A first etch is performed, via step 162. For example, a reactive ion etch (RIE) appropriate for the portion of the intermediate layer to be removed may be performed in step 162. The etch may be a silicon oxide RIE that removes a portion of the second sublayer 264'. For example, the RIE may use fluorine-based chemistry that may provide a smaller trench sidewall angle. Thus, a portion of the trench for the main pole is provided in step 162. FIGS. 12A, 12B, 12C and 12D depict side, ABS, recessed and plan views, respectively, of the transducer 250 after step 162 has been completed. A trench 280 in the sublayers 262" and 264" has been formed by step 162. Because of the presence of the mask 278', the trench 280 is only in the region recessed from the ABS. Thus, the trench 280 corresponds to the location and geometry desired form the pole in the yoke and paddle regions.

The mask 278 is removed, via step 164. Thus, an additional portion of the intermediate layer 254 is exposed in the aperture 258. Step 164 may include performing a resist strip. Note that in some embodiments, the photoresist mask 278 may be omitted. In such embodiments, step 164 may be skipped.

A second etch is performed, via step 166. The etch chemistry is appropriate for the first sublayer 262". For example, an aluminum oxide RIE may be used in step 166. This RIE may use a chlorine-based chemistry. The RIEs performed in steps 162 and 166 may use different chemistries in order to provide different sidewall angles in different portions of the trench. Step 166 also etches through the first hard mask layer 273. FIGS. 13A, 13B, 13C and 13D depict side, ABS, recessed and plan views, respectively, of the transducer 250 after step 166 has been completed. Thus, the trench 280' has been formed in both the ABS/pole tip and recessed/yoke and paddle regions. A remaining portion of the first sublayer 262''' is shown. The sidewall angles of the trench 280' differ at different distances from the ABS. In some embodiments, the sidewall angle at the ABS is at least twelve degrees and not more than sixteen degrees. The sidewall angle further from the ABS is less than the sidewall angle at the ABS. In some embodiments, the sidewall angle for the trench 280' in the recessed view at least zero degrees and not more than five degrees.

A seed layer that is resistant to an etch of the first sublayer 262''' is deposited in the trench, via step 168. In some embodiments, this seed layer may serve as at least part of the gap. The seed layer may include material(s) such as Ru. In other embodiments, a magnetic seed layer may be used in lieu of or in addition to a nonmagnetic seed layer. FIGS. 14A, 14B, 14C and 14D depict side, ABS, recessed and plan views, respectively, of the transducer 250 after step 170 has been completed.

A plating mask is provided, via step 170. The mask may be a photoresist mask that covers a portion of the trench 280'. FIGS. 14A, 14B, 14C and 14D depict side, ABS, recessed and plan views, respectively, of the transducer 250 after step 170 has been completed. Thus, seed layer 282 and plating mask 284 are shown. The mask 284 has an aperture that exposes only a portion of the trench 280'. In some embodiments, all of the pole tip/ABS region is exposed, but only a portion of the yoke and paddle regions are exposed.

The main pole materials may then be plated, via step 172. Step 172 includes depositing high saturation magnetization magnetic material(s), for example via electroplating. FIGS. 15A, 15B, 15C and 15D depict side, ABS, recessed and plan views, respectively, of the transducer 250 after the pole materials have been deposited. The pole material(s) 290 are thus shown. The pole material(s) occupy only a portion of the trench. The mask 284 may be removed as part of step 172. FIGS. 16A, 16B, 16C and 16D depict side, ABS, recessed and plan views, respectively, of the transducer 250 after step 172 has been completed. Thus, the mask 284 has been removed. Because of the use of the mask 284, the main pole materials 290 have vertical sidewalls in a portion of the pole the recessed from the ABS.

The portion of the trench 280' between the main pole materials 290 and the seed layer(s) 282 provided in step 168 may be optionally refilled with a nonmagnetic material, via step 174. The refill and seed layer(s) 282 be used to form a side gap that is conformal in some regions and nonconformal in other regions. FIGS. 17A, 17B, 17C and 17D depict side, ABS, recessed and plan views, respectively, of the transducer 250 after step 174 has been completed. Thus, gap layer 292 has been provided. The gap layer 292 may be aluminum oxide and/or silicon oxide.

Figure 18A:
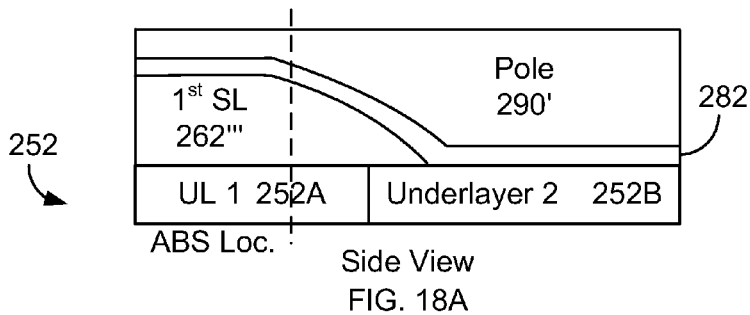
Figure 18B:
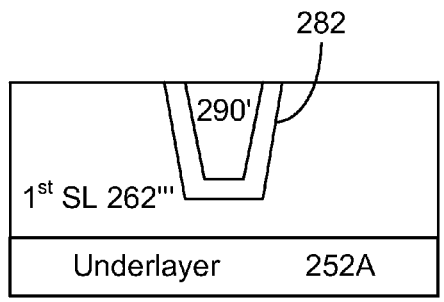
Figure 18C:
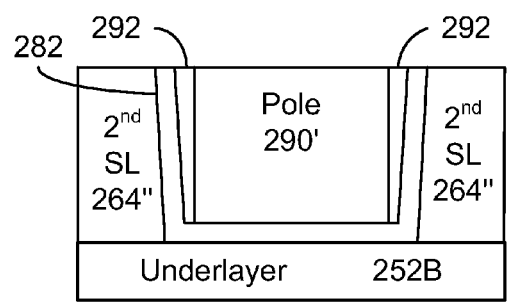
Figure 18D:
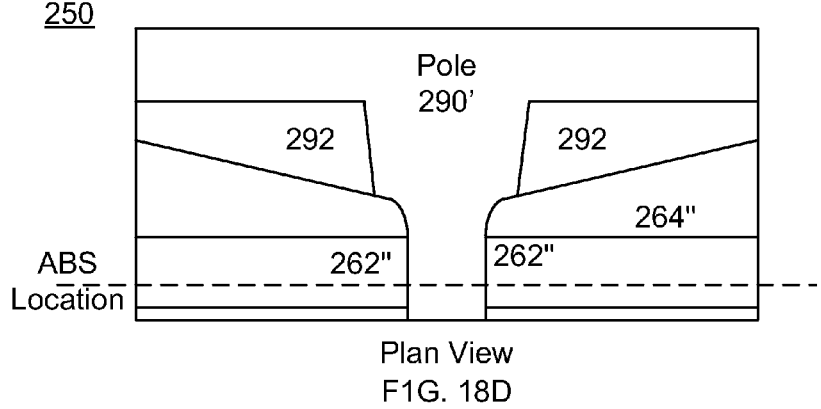
Figure 19A:
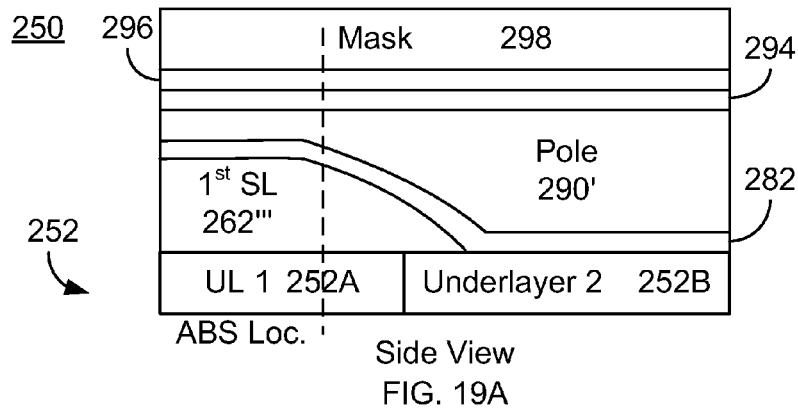
Figure 19B:
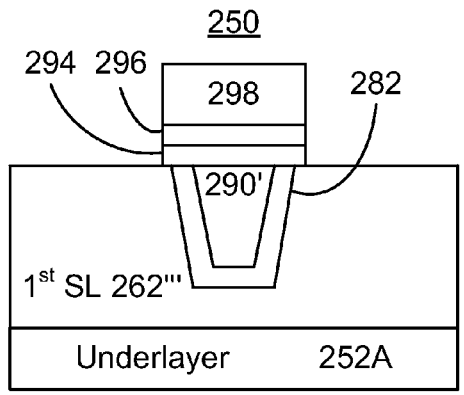
Figure 19C:
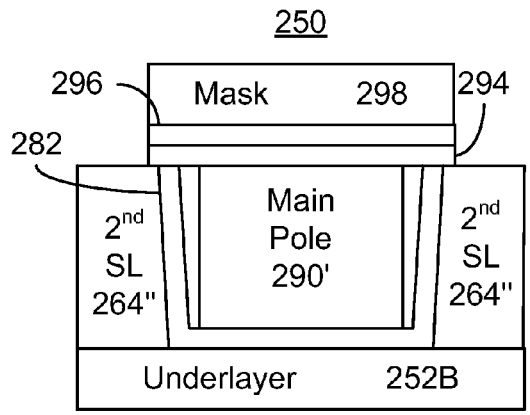
Figure 19D:
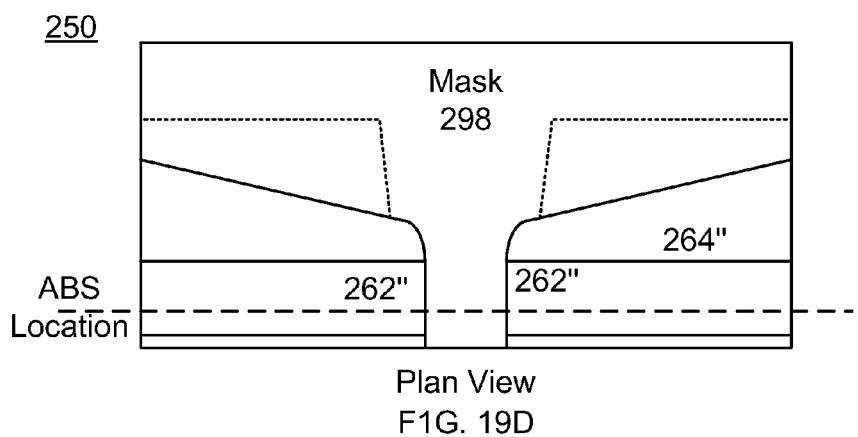
Figure 20A:
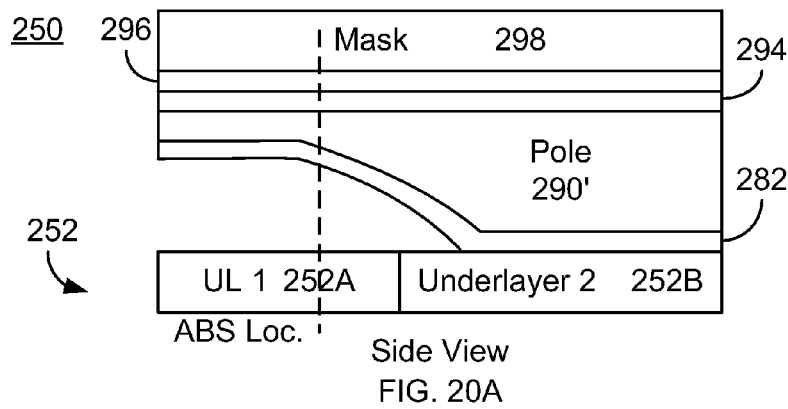
Figure 20B:
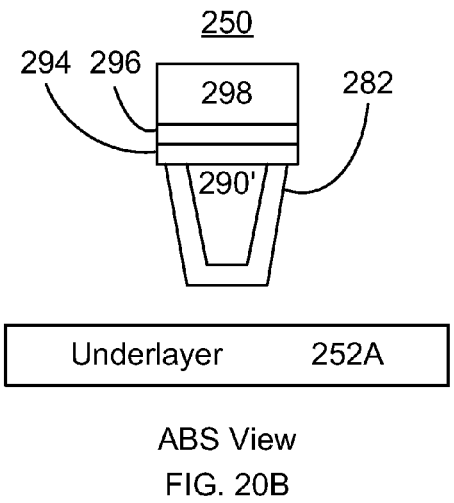
Figure 20C:
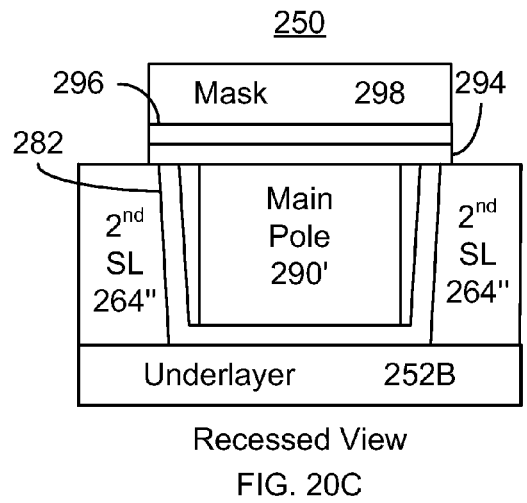
Figure 20D:
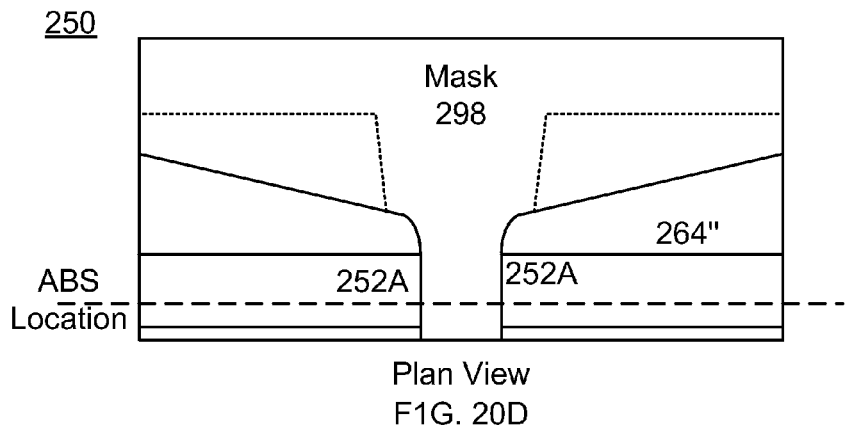
Figure 21A:
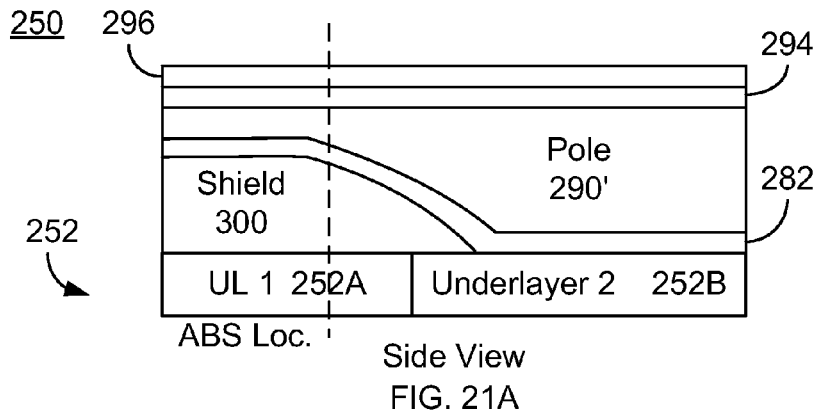
Figure 21B:
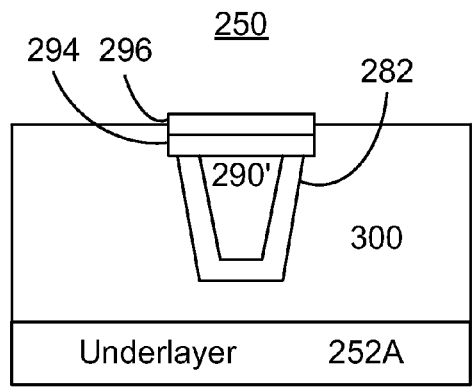
Figure 21C:
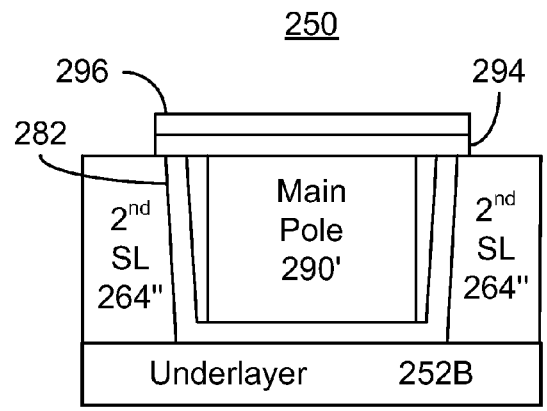
Figure 21D:
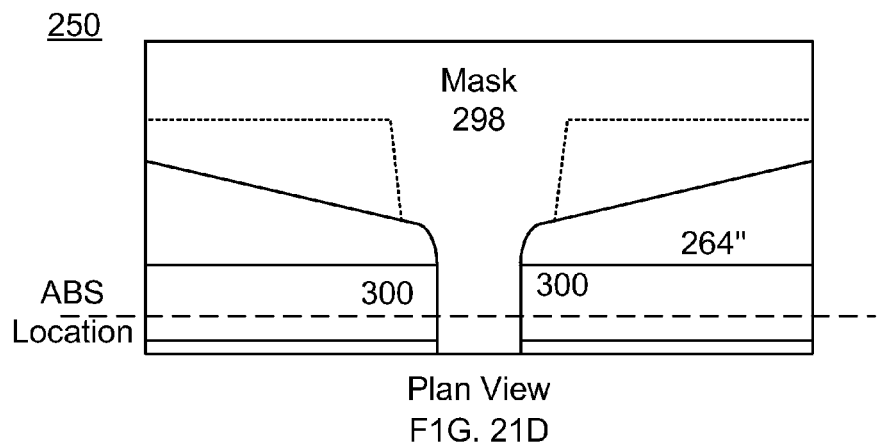

A planarization, such as a CMP is performed, via step 176. A leading bevel may be naturally formed in the magnetic pole in step 172 due to the shape of the trench 280' above the first sublayer 262''' and the deposition techniques used. A trailing bevel may also be provided as part of step 176. For example, a portion of the main pole may be covered by a mask after the planarization. Another portion of the main pole at and near the ABS may be removed, for example via an ion mill. FIGS. 18A, 18B, 18C and 18D depict side, ABS, recessed and plan views, respectively, of the transducer 250 after step 176 has been completed. The remaining portion of the gap 292 and the seed layer 282 form the side gap. Thus, as can be seen in FIGS. 18B-18D, the side gap 282/292 is not conformal for regions recessed from the ABS. Near the ABS, the side gap 282 is conformal. At and near the ABS, the pole 290' fills the trench. However, further from the ABS, the gap 292 occupies a region between the edges of the trench/seed layer 282 and the pole 290'. In the embodiment shown, the main pole 290' does not include a trailing bevel. However, in other embodiments, a trialing bevel may be provided. The main pole 290' may be viewed as being formed in steps 170, 172, and 176. The side gap may be viewed as being formed in steps 168, 174 and 176.

The remaining portion of the first sublayer 262''' is removed, via step 178. Step 178 includes providing a mask. FIGS. 19A, 19B, 19C and 1D depict side, ABS, recessed and plan views, respectively, of the transducer 250 after the mask has been provided for step 178. Thus, layers 294, 296 and 298 that form the mask have been provided. The layer 294 may be a Ta layer, the layer 296 may be a Ru layer, while the layer 298 may be a photoresist mask. An etch, such as a wet etch may be used to remove the remaining portion of the first sublayer 262". FIGS. 20A, 20B, 20C and 20D depict side, ABS, recessed and plan views, respectively, of the transducer 250 after step 178 has been completed. Thus, the sublayer 262''' has been removed.

The side shield(s) may be provided, via step 180. Step 174 may include providing a wraparound shield. magnetic material(s) may thus be plated or otherwise deposited. Thus, the soft magnetic material(s) for the shield may be deposited. In some embodiments, the materials are planarized. Thus, only side shields may be provided, the side shields may be separated from a trailing shield by a nonmagnetic layer, or the trailing shield may then be provided directly on the side shields. The FIGS. 21A, 21B, 21C and 21D depict side, ABS, recessed and plan views, respectively, of the transducer 250 after step 180 has been completed. Thus, side shield 300 has been provided. In the embodiment shown in FIGS. 21A-21D, the shield 300 is a side shield. In other embodiments, a wraparound shield may be provided.

Using the method 150, the pole 290' may be provided. The sidewall angles of the pole 290' may vary because of the manner in which the trench is formed and/or because the pole may be deposited with another mask in place. This may be achieved while exposing the ABS to only a single etch in forming the trench. In addition, a side gap having conformal and nonconformal regions may be provided. This may also improve performance of the transducer 250. These benefits may be achieved without significantly complicating processing. Thus, performance of the disk drive may be improved.

We claim:

1. A method for fabricating magnetic transducer having air-bearing surface (ABS) location, the method comprising:
    providing an etchable layer including a first sublayer in at least a side shield region and a second sublayer residing outside of the at least the side shield region, the side shield region including a portion of the ABS location, the second sublayer being different from the first sublayer;
    forming a trench in the etchable layer using a plurality of etches, a first etch of the plurality of etches removing a portion of the second sublayer and providing a first portion of the trench having a first sidewall angle with a down track direction, a second etch of the plurality of etches removing a portion of the first sublayer and providing a second portion of the trench having a second sidewall angle with the down track direction, the second sidewall angle being greater than the first sidewall angle, the second portion of the trench including an additional portion of the ABS location, the plurality of etches consisting of a plurality of reactive ion etches such that the trench is formed by the plurality of reactive ion etches, the first etch being a first reactive ion etch, the second etch being a second reactive ion etch;
    providing a main pole in the trench, the main pole having a plurality of sidewalls, the plurality of sidewalls having the second sidewall angle in the second portion of the trench and at least one main pole sidewall angle corresponding to the first sidewall angle in the first portion of the trench.

2. The method of claim 1 wherein the first etch is performed before the second etch.

3. The method of claim 1 wherein the second etch is performed before the first etch.

4. The method of claim 1 wherein the step of providing the trench further includes:
    providing a mask exposing a first region corresponding to the first portion of the trench and covering a second region corresponding to the second portion of the trench;
    removing the portion of the second sublayer corresponding to the first portion of the trench using the first etch of the plurality of etches;
    removing the mask; and
    removing the portion of the first sublayer corresponding to the second portion of the trench using the second etch.

5. The method of claim 1 wherein the step of providing the etchable layer further includes:
    providing a first material corresponding to the first sublayer in the at least the shield region; and
    providing a second material corresponding to the second sublayer outside the shield region.

6. The method of claim 5 wherein the step of providing the first material further includes full-film depositing the first material and wherein the step of providing the second material further includes:
    removing a portion of the first material outside of the shield region, a remaining portion of the first material forming the first sublayer;
    full film depositing the second material; and
    planarizing at least the second material such that a remaining portion of the second material outside of the at least the shield region forms the second sublayer.

7. The method of claim 6 wherein the first material includes aluminum oxide and the second material includes silicon oxide.

8. The method of claim 1 wherein the second sidewall angle is at least twelve degrees and not more than sixteen degrees and wherein the at least one main pole sidewall angle is at least zero degrees and not more than five degrees.

9. The method of claim 8 wherein the at least one main pole sidewall angle is not more than three degrees.

10. The method of claim 1 wherein the second sidewall angle is at least three degrees and not more than nine degrees and wherein the at least one main pole sidewall angle is at least zero degrees and not more than five degrees.

11. The method of claim 1 further comprising:
providing a side gap adjacent to a portion of the main pole; and
providing a side shield, the side gap residing between the side shield and the main pole.

12. The method of claim 11 wherein the step of providing the side gap further includes:
providing a conformal portion of the side gap such that a first portion of the main pole is conformal with the trench; and
providing a nonconformal portion of the side gap such that a second portion of the main pole is nonconformal with the trench.

13. The method of claim 12 wherein the step of providing the main pole further includes:
providing a mask having an aperture therein, the aperture exposing a portion of the trench;
depositing at least one pole material in the portion of the trench; and
planarizing the at least one pole material.

14. The method of claim 13 wherein the step of providing nonconformal portion of the side gap further includes:
depositing a nonmagnetic layer, the nonmagnetic layer refilling an additional portion of the trench covered by the mask; and
planarizing the nonmagnetic layer.

15. The method of claim 11 wherein the step of providing the main pole further includes:
depositing a seed layer, a portion of the seed layer residing in the trench; depositing at least one magnetic pole material; and
planarizing at least the at least one magnetic pole material.

16. The method of claim 15 wherein the step of providing the side shield further includes:
removing a remaining portion of the first sublayer in the side shield region.

17. The method of claim 16 wherein step of removing the remaining portion of the first sublayer further includes:
wet etching the first sublayer using an etchant, the seed layer being resistant to the etchant.

18. A method for fabricating magnetic transducer having air-bearing surface (ABS) location comprising:
full film depositing a first material;
removing a portion of the first material outside at least a side shield region, the side shield region including a first portion of the ABS location;
full film depositing a second material different from the first material;
planarizing at least the second material such that a remaining portion of the first material forms a first sublayer in the at least the side shield region and a remaining portion of the second material outside of the side shield region forms a second sublayer, the first sublayer and the second sublayer forming an etchable layer;
providing a mask on the etchable layer, the mask exposing a first region corresponding to a first portion of a trench and covering a second region corresponding to a second portion of a trench;
removing a portion of the second sublayer using a first etch to provide the first portion of the trench having a first sidewall angle of not more than three degrees, the first etch being a first reactive ion etch;
removing the mask;
removing a portion of the first sublayer using a second etch to provide the second portion of the trench having a second sidewall angle, the second sidewall angle being greater than the first sidewall angle, the second portion of the trench including a second portion of the ABS location, the second etch being a second reactive ion etch, the trench being formed by the first reactive etch and the second reactive ion etch;
depositing at least one seed layer, a first portion of the at least one seed layer residing in the trench;
providing a main pole in the trench, the main pole having a plurality of sidewalls, the plurality of sidewalls having the second sidewall angle in the second portion of the trench and at least one main pole sidewall angle corresponding to the first sidewall angle in the first portion of the trench, the step of providing the main pole including depositing at least one magnetic pole material and planarizing at least the at least one magnetic pole material;
providing a side gap adjacent to a portion of the main pole, the step of providing the side gap including providing a conformal portion of the side gap such that a first portion of the main pole is conformal with the trench and providing a nonconformal portion of the side gap such that a second portion of the main pole is nonconformal with the trench, the side gap including a second portion of the at least one seed layer;
removing a remaining portion of the first sublayer; and
providing a side shield, the side gap residing between the side shield and the main pole.

19. The method of claim 1 wherein the step of forming the trench formed in the etchable layer is configured such that the first portion of the trench formed by the first etch has a first footprint corresponding to the main pole upon termination of the first etch and the second portion of the trench formed by the second etch has a footprint corresponding to the main pole upon termination of the second etch.

20. The method of claim 18 wherein the step of removing the portion of the second sublayer using the first etch is configured such that the first portion of the trench formed by the first etch has a first footprint corresponding to the main pole upon termination of the first etch; and
wherein the step of removing the portion of the first sublayer using the second etch is configured such that the second portion of the trench formed by the second etch has a footprint corresponding to the main pole upon termination of the second etch.

* * * * *